United States Patent
Abou-Rizk et al.

(10) Patent No.: US 8,863,178 B1
(45) Date of Patent: Oct. 14, 2014

(54) SYSTEMS AND METHODS FOR PROVIDING TARGETED ADVERTISING AND CONTENT DELIVERY TO MOBILE DEVICES

(71) Applicant: Verve Wireless Inc., Encinitas, CA (US)

(72) Inventors: Mitri Abou-Rizk, Newton, MA (US); Thomas C. Kenney, Encinitas, CA (US); Nathan A. McCall, Encinitas, CA (US); Brian M. Collison, Encinitas, CA (US); Eric M. Johnston, Houston, TX (US)

(73) Assignee: Verve Wireless Inc., Carlsbad, CA (US)

( * ) Notice: Subject to any disclaimer, the term of this patent is extended or adjusted under 35 U.S.C. 154(b) by 0 days.

(21) Appl. No.: 13/956,169

(22) Filed: Jul. 31, 2013

Related U.S. Application Data

(63) Continuation of application No. 12/163,780, filed on Jun. 27, 2008, now Pat. No. 8,510,773.

(60) Provisional application No. 60/946,677, filed on Jun. 27, 2007.

(51) Int. Cl.
| | |
|---|---|
| *H04N 7/10* | (2006.01) |
| *H04N 7/025* | (2006.01) |
| *H04N 7/16* | (2011.01) |
| *G06Q 30/02* | (2012.01) |
| *H04N 21/234* | (2011.01) |

(52) U.S. Cl.
CPC ..... *H04N 21/23424* (2013.01); *G06Q 30/0261* (2013.01)
USPC ............... 725/35; 725/34; 725/36; 725/62

(58) Field of Classification Search
CPC ................. H04N 21/25841; H04N 21/2662; H04N 21/2668; H04N 21/4622; H04N 21/812; H04N 21/8126
USPC ........... 725/42, 34–36, 62; 705/53–14.55, 11, 705/14.66, 14.77–14.73
See application file for complete search history.

(56) References Cited

U.S. PATENT DOCUMENTS

| | | | |
|---|---|---|---|
| 5,953,506 | A | 9/1999 | Kalra et al. |
| 7,856,372 | B2 | 12/2010 | Ullah |
| 2007/0067214 | A1 | 3/2007 | Caprio et al. |
| 2007/0214045 | A1 | 9/2007 | Subramanian et al. |
| 2008/0090513 | A1 | 4/2008 | Collins et al. |
| 2008/0098420 | A1 | 4/2008 | Khivesara et al. |
| 2008/0262901 | A1 | 10/2008 | Banga et al. |

OTHER PUBLICATIONS

Office Action mailed Jan. 21, 2011 for U.S. Appl. No. 12/163,780.
Final Office Action mailed Oct. 17, 2011 for U.S. Appl. No. 12/163,780.
Office Action mailed Aug. 28, 2012 for U.S. Appl. No. 12/163,780.

*Primary Examiner* — Hai V Tran

(57) ABSTRACT

Systems and methods are described for providing targeted content delivery, including advertising, to mobile devices. A content organization and distribution system may be configured to receive content from a plurality of publishers and provide targeted content to a plurality of users having mobile devices, where the mobile devices are connected to the content organization and distribution system through a plurality of carriers. The provided content may be based on one or more user customization criteria.

18 Claims, 26 Drawing Sheets

APIs for Configuring Client
Look and Feel

APIs for enabling a plugin to a
CMS

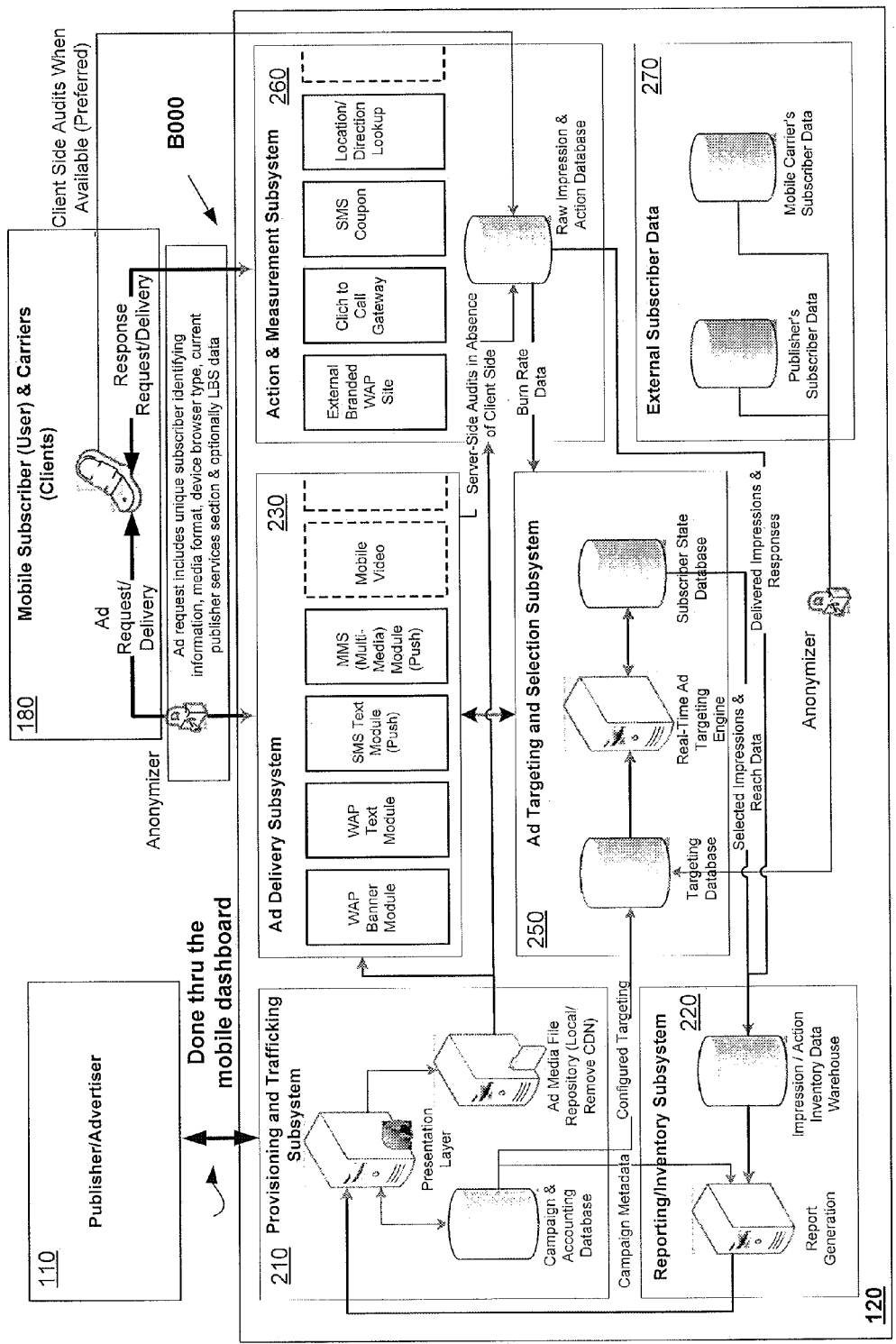
FIG. 2 – One Embodiment of a Verve Ad System

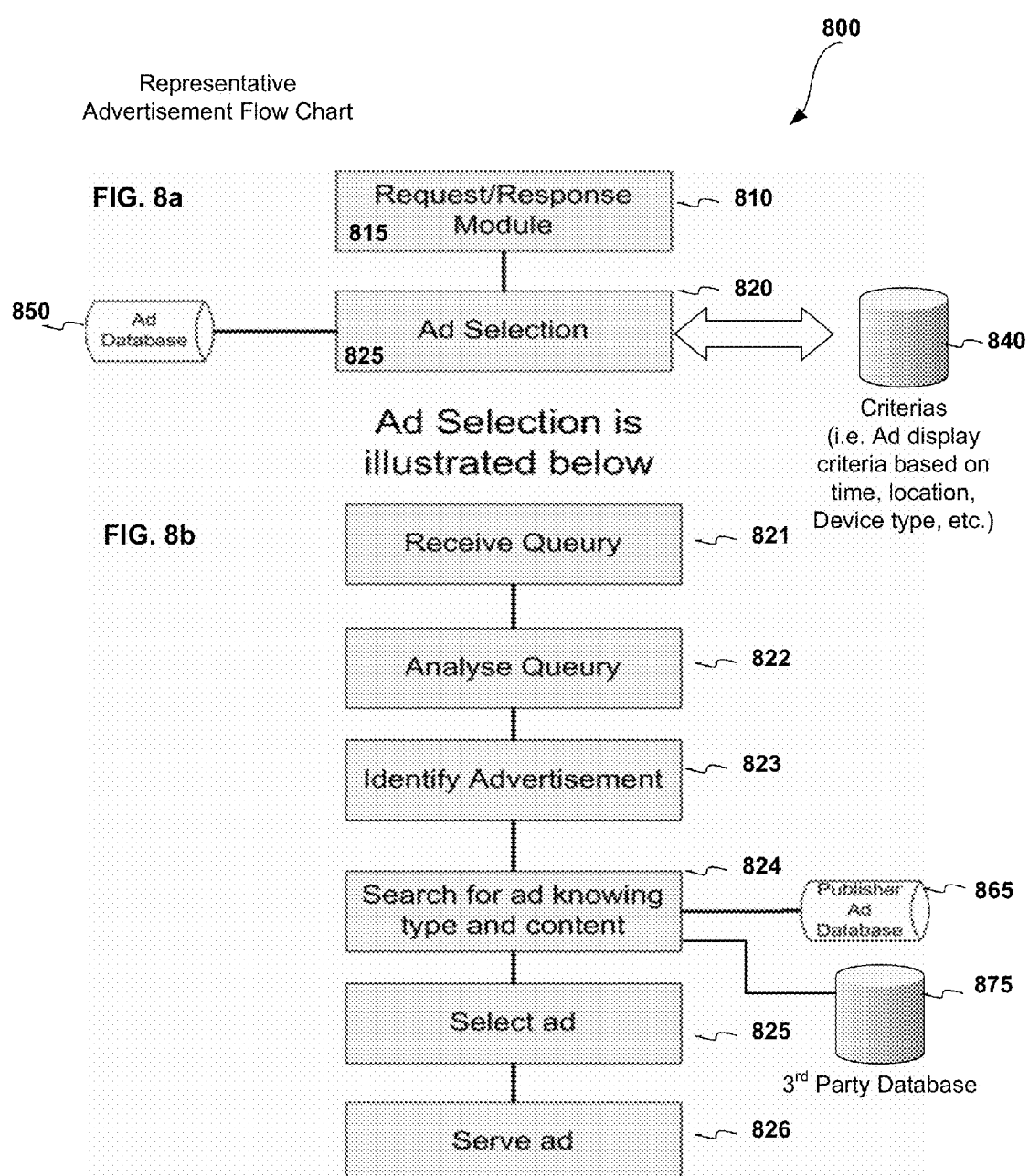

Test Partner 99

⊙ enablement test

BD 96x16 Test Link

Home

My Page

1305 → The Last King of Scotland   Review >>
7:30 at AMC Gallery Place
Contacts: 7 invited, 3 replied.
[View Invite | Next 3 Events]
-----------------------------

Last Night: *Bouncing Souls at 9:30 Club*
[My Pictures | All Pictures]
-----------------------------

New sushi joint is fun, exiting and full of fish   Review >>
1309 → [Go There!]

Phillies Edge Out Skins 28 to 24   News >>

Sculpture Show at Gallery X   Event >>
[Go There!]

Flyers Skate on Ice! Stuff happens   News >>

1 through 5 of 12 [Next 5]

[My Events | My Pictures | Contacts | Preferences]

⩔ POWERED

FIG. 13

One Embodiment of High Level System Operation

One Embodiment of Device Type Determination

One Embodiment of Ad Selection

One Embodiment of AdCel High Level Configuration

One Embodiment of User Preference
Setting and Customization

SYSTEMS AND METHODS FOR PROVIDING TARGETED ADVERTISING AND CONTENT DELIVERY TO MOBILE DEVICES

CROSS REFERENCE TO RELATED APPLICATIONS

This application is a continuation of U.S. patent application Ser. No. 12/163,780, filed Jun. 27, 2008, which claims priority under 35 U.S.C. §119(e) to U.S. Provisional Patent Application Ser. No. 60/946,677, entitled SYSTEMS AND METHODS FOR PROVIDING TARGETED ADVERTISING AND CONTENT DELIVERY TO MOBILE DEVICES, filed Jun. 27, 2007, both of which are incorporated herein by reference in their entirety.

FIELD OF THE INVENTION

This invention relates generally to the field of the mobile Internet and associated content delivery. More particularly but not exclusively, this invention relates to systems and methods for providing content delivery, including advertising, from publishers and their associated advertisers via the mobile Internet, including providing micro-advertising based on user-tailored criteria as well as by user location (location based information also denoted herein as LBS) and temporal information that may be device specific and tailored to a specific network (e.g., 3G, 4G, and the like). The invention also relates to systems and methods for enabling content publishers to provide targeted advertising and other types of content to mobile users independently of the user's particular wireless carrier, particular mobile device, or over the air (OTA) provider.

BACKGROUND

Providers of goods and services have as a key goal the ability to identify and target the right customers in the right fashion. The "holy grail" of advertising is a one-to-one relationship between the marketer and the consumer. Ideally this would be done by selecting the right customer, in the right place, at the right time, and tailoring advertising or other content to that customer to minimize cost and maximize efficiency. Marketers desire to deliver their message only to customers who are interested and receptive, with the message personalized to the particular customer. This problem is particularly acute for smaller advertisers, who may have only limited advertising budgets and may desire to target only a small and/or selective group of customers.

Traditional advertising media, has, for a number of reasons, provided limited ability to achieve these goals. For example, much traditional advertising has been focused on providing large scale brute force marketing. Television advertising typically targets general populations with only the limited possibility of tailoring based on particular audience demographics, time of day, or subject matter. This approach remains relatively coarse in targeting desirable customers and is typically quite expensive. Likewise, print media such as newspapers and magazines target general audiences, with limited potential for focusing on potential customers who are the "right" customers for particular content, products, or services. Focusing can be done based on the publication's subject matter, article positioning, markets served, or other focusing criteria; however, targeting is still typically coarse, inefficient and potentially costly, with little or no ability to personalize content presentation or implement behavioral targeting.

The advent of the Internet has introduced a new era in marketing and advertising. Using the Internet, advertisers are now able to enhance content delivery using means such as contextual targeting, message customization, easy and immediate response methods, more accurate performance measurement, performance-based billing, as well as limited ability to target based on geography. These approaches can make advertising more efficient and focused, and potentially allow for better target customization. For example, companies like Google and Yahoo have been successful at providing online advertising; however, their success is limited by the user's query (search request keywords and the like). Google's ad sense service is based on contextual ads but their analysis is based on web page content only.

The traditional Internet is still, however, largely limited to fixed locations (i.e. places where a user's desktop or portable computer can be operated in a static fashion) since computers are rarely carried by users while being operational and connected to the Internet. Moreover, computers are typically not truly personal devices because they are often shared with others.

Mobile phones, however, are truly personalized devices that tend to be on, connected to wireless networks, and in the user's possession at most times. This has led to the rapid growth and proliferation of mobile devices that combine characteristics of traditional mobile telephony with Internet capabilities.

Consequently, it is anticipated that the next step in the evolution of advertising will likely be focused on the mobile web and truly portable devices such as web enabled phones, personal digital assistants (PDAs), and similar devices. These devices and their associated wireless carrier services open the possibility for new, more efficient marketing and advertising methods wherein content providers can target customers in a much more efficient, granular fashion, and messages can be presented in a personalized fashion only to users who desire such content. Despite this promise, there are multiple carriers using different and/or proprietary systems that make it difficult for advertisers to target all potential users without engaging separately with these multiple carriers and navigating their various interfaces and requirements. Accordingly, there is a need in the art for improved systems and methods for providing targeted advertising and other content to mobile devices.

SUMMARY

The present invention relates generally to facilitating providing content from publishers to users based on user targeted criteria. The content may include user tailored news, images, videos, advertisements or other types of content that can be delivered to a fixed or mobile device.

In one aspect, embodiments of the present invention relate to a content organization and distribution system including a first interface module disposed to interface to a plurality of content providers so as to receive provided content from the content providers, a second interface module disposed to provide a plurality of interfaces to a corresponding plurality of carriers to provide selected content to the plurality of carriers, a database in which is stored the provided content, the provided content including a plurality of sets of content associated with the plurality of content providers, and a plurality of sets of information associated with ones of a corresponding plurality of users of ones of the plurality of carriers, and a processing module configured to select, from the plurality of sets of content, a first set of content associated with a first of the plurality of content providers and configure at least a portion of said first set of content to be delivered to a first user served by a first of the plurality of carriers; wherein the first set of content is selected based at least in part on a set of information associated with the first user.

In another aspect, embodiments of the present invention relate to an advertisement provisioning system including a first interface module disposed to interface to one or more local advertisement providers to receive local advertising content, a second interface module disposed to interface to ones of a plurality of third party advertisement providers to receive third party advertising content, a third interface module disposed to provide ones of a plurality of interfaces to ones of a corresponding plurality of carriers, and a processing module configured to receive a request for content from a first device associated with a first user, wherein the first device is configured to communicate with a first carrier of the plurality of carriers, select an advertisement from one of the local advertisement providers or the third party advertisement providers, and format the selected advertisement for delivery to the first device based at least in part on a set of device capabilities associated with the first device.

In another aspect, embodiments of the present invention relate to a method of providing content including receiving ones of a plurality of sets of content from ones of a plurality of content providers, storing the plurality of sets of content in a database, receiving a request to provide content to a first user device configured to communicate with a first carrier, and selecting a first portion of content from a first set of content included among the plurality of sets of content for delivery to the first user device, where the selecting is based at least in part on a first user customization criteria associated with a first user of the first user device.

In another aspect, embodiments of the present invention relate to a method of selecting user tailored content for delivery to a device including receiving, from a first device associated with a first user, a first message having a first header, the first device being configured to communicate with a first carrier, wherein the first header includes first URL information and first device type information, determining a first device type associated with the first device based on the first device type information, extracting a first template from a database, the first template being configured for presentation of content on the first device based on the first device type, selecting a first set of content for delivery to the first device, said first set of content selected based at least in part on a set of user customization criteria associated with the first user, and incorporating the first set of content into the first template to create a set of first user customized content.

Additional aspects of the present invention are further described below in conjunction with the drawings.

BRIEF DESCRIPTION OF THE FIGURES

The invention is more fully appreciated in connection with the following detailed description taken in conjunction with the accompanying drawings, in which:

FIG. 1d illustrates an embodiment of a set of APIs for enabling a CMS plug-in.

FIG. 2 illustrates an embodiment of a system in accordance with aspects of the present invention.

FIG. 8a illustrates a process for supplying advertising in accordance with an embodiment of the present invention.

FIG. 8b illustrates a process for selecting advertising in accordance with an embodiment of the present invention.

FIG. 13 illustrates an embodiment of a user display in accordance with aspects of the present invention.

Figure 1A:
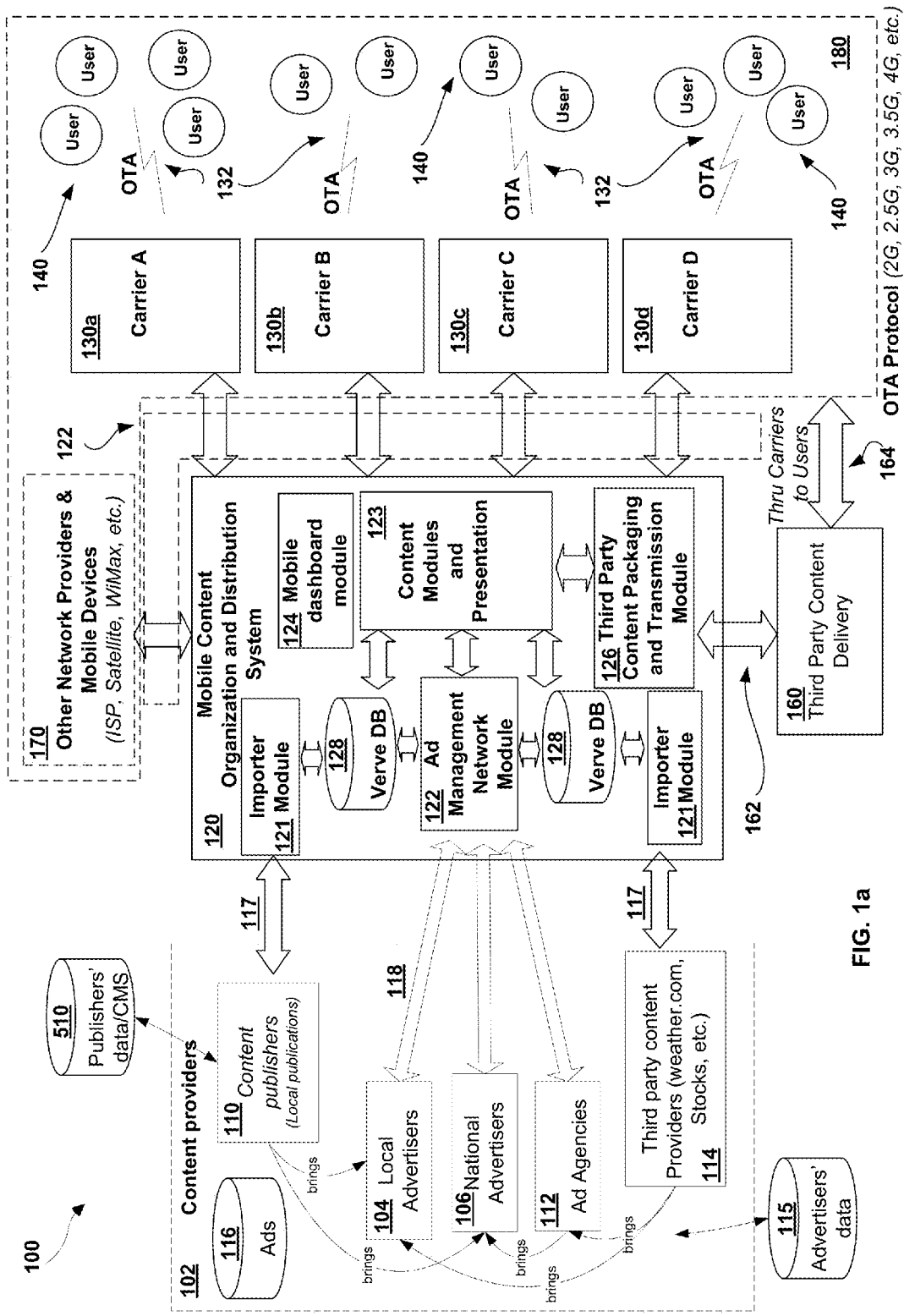
FIG. 1a illustrates a high level diagram of an embodiment of a system in accordance with aspects of the present invention.

DETAILED DESCRIPTION OF EMBODIMENTS
OF THE INVENTION

The present invention relates generally to the field of the mobile Internet and associated content delivery, including advertising. More particularly but not exclusively, this invention relates to systems and methods for providing content delivery from publishers and their associated advertisers via the mobile Internet, including providing micro-advertising based on user tailored criteria as well as by user location (location based information, also denoted herein as LBS) and temporal information. Targeting on the platform may be based on geo-targeting, contextual targeting, behavioral targeting, zone targeting, bandwidth targeting, language targeting, portal targeting, domain and IP targeting, content targeting, time/date targeting such as hour of the day, day of the week, as well as other targeting criteria. Content publishers are enabled to provide targeted advertising and other content to mobile users independently of the user's particular wireless carrier (operator) or other over the air (OTA) provider. Relevant content and local advertising is provided to mobile users, and local advertisers are provided access to users interested in specific local information at relevant times.

In one or more embodiments, aspects of the present invention may be described below with respect to a particular implementation provided by a company known as Verve Wireless. These embodiments may describe associated systems components and functionality as a "Verve System" or "Verve" components or functionality for purposes of brevity and convenience. It is noted that the invention is not so limited and is described in this content merely for purposes of convenience, not limitation.

Traditional local media content publishers use to enjoy direct relationships with local customers that enabled the publishers to charge advertisers significantly high advertising rates to reach these customers. Local newspapers, magazines, radio, and television all enjoyed strong customer connections and advertising relationships. However, with the Internet, customers were suddenly able to receive similar content from many sources, and began to enjoy the ability to determine what content to receive and when to receive it—completely turning the old media consumption model on its head. Large web companies like Google, Yahoo, and eBay built solutions that met consumers on-demand requirements. Traditional media did not respond to these new competitors initially or effectively thus allowing them to grow to significant positions in the marketplace. These large web companies offered better solutions for consumers and became the main focus area for advertisers because of the significant consumer usage and reach they offered. The paradox is that the large web companies were delivering the content created by traditional and local media to consumers—thus building their businesses on the back of the industry.

Due to significant loss in revenue and customers, traditional media is starting to react. Ultimately, they have assets and capabilities that can never be matched by Internet companies. These are the creation of content, the sale of local advertising, and local brands. The mobile web offers the ability for publishers and advertisers to connect directly—one to one with consumers in the local market place. Mobile offers the ability to communicate and transact with individuals. The medium is by it very nature local and as such local media/traditional media already have huge competitive advantages versus international-minded web companies. However, local media need to partner and work together so they can drive leverage and ultimately margins with distributors and advertisers. A local property with 50,000 users cannot negotiate with carriers or advertising agencies. However, 2000 local publishers with 2 million customers and national reach can compete with and negotiate favorable terms with any entity. Embodiments of the present invention are configured to address this need by facilitating direct connection and content delivery to consumers, aggregation of users and properties, maximum profitability and new business models for local media so that local media can compete for and win consumers in the new On-Demand world.

As the mobile Internet develops it is likely to increasingly be driven by local content, such as locally-oriented personalized advertising. For example, local content of interest to mobile device owners may consist of content and information associated with local news, local events, locally provided goods and services, as well as associated advertising and the like. At the same time, industry predictions suggest that by 2009 most consumers will have broadband-enabled mobile devices (3G devices with data capabilities up to 500 kbps) with location identification technology accurate to 10 meters or better. These capabilities make mobile devices attractive to advertisers if they can selectively target customers within the appropriate location, with appropriate needs/interests, at the right time. For example, a restaurant owner may want to drive customer interest by targeting interested mobile users within a certain distance (for example, 1 mile) and during a certain time (such as lunchtime—between 11 am and 1 pm) by providing a discount coupon or other incentive to receptive potential customers.

This approach present problems, however, when an advertiser has to deal with multiple carriers to access their respective customers and has little or no knowledge of the customer's personal characteristics or interests. For example, as of the time of filing of this application, there are four primary mobile carriers (Sprint, Verizon, AT&T, & T-Mobile) in the United States. In order to reach the broadest potential market, advertisers would typically need to engage separately with each of these carriers to reach their respective subscriber bases (except possibly with off deck solutions; however, these approaches will not be as valuable from an advertising revenue perspective). Also, each mobile carrier typically has a separate database containing similar information but with different types of access. In addition, many carriers are now partnering with preferred ad delivery partners (for example, Verizon with Third Screen Media and Sprint with Enpocket). These ad delivery partners are developing their own in-house technology to handle wireless advertising, which requires that advertisers become familiar with each of their respective ad delivery technologies. It is one goal of the present invention to hide these differences from users to provide more seamless, integrated access.

Advertisers typically drive their content to users either directly or through content publishers or advertising agencies. One particular category of interest is that of local publishers. Local publishers include local content providers such as small newspapers, magazine publishers, or other similar content providers who wish to promulgate content of interest to a small population of interest or within a local community (for example, a small-town newspaper or community newspaper within a larger city may wish to reach only users within a limited geographic area), as well as larger entities owning multiple local publishers. Local advertisers commonly distribute advertising and content through local publishers. It is noted that as used herein, the term advertiser refers to an individual or entity that desires distribution of their content, such as information, promotions, advertisements, or other content, to potential customers or others who may desire receipt of their content. Advertisers, publishers, and other content providers may also be grouped generically as a category denoted herein as content providers as shown, for example, in FIGS. 1a and 1b. A local advertiser is typically a local or regional store, business or other entity that may be interested in targeting a local market. National advertisers are typically larger, national companies that are interested in attracting business throughout the country. In some cases, national advertisers may be interested in assisting local advertisers (for example, a national advertiser such as Budweiser may be interested in driving sales to a local advertiser such as a restaurant or bar). In a typical relationship, the end user with a mobile device (also denoted herein as a consumer or user) is looking for trusted information and content, such as products, services, reviews, discounts, customer desired or targeted advertisements and the like. The publishers, due to their brands, own such information and have established relationships with local advertisers, like a local store or service provider such as a dry cleaner in the neighborhood. The advertiser wishes to target the consumer with relevant content desired by the consumer.

The local advertising market is one of particular interest. It has been estimated that there are more than 8,000 local publishers in the United States alone and 30,000 or more worldwide. These local publishers may wish to distribute content to users with mobile devices from one or more of the individuals or businesses who advertise in their print editions, web editions, or via other publications or media. They may also benefit from receiving information about ad tracking and performance monitoring and reporting. For these publishers to maximize value and provide the most relevant content, they need to be able to access and partner with multiple mobile carriers who have the ability to provide location data, customer demographics, distribution, promotion, messaging services, and the necessary network connections to their users' mobile devices.

Likewise, it is advantageous for wireless carriers to embrace local publishers because their customers want and will seek local, personalized content targeted to them based on their interests, location, as well as in some cases time of day or other parameters. At the same time, the carriers will have difficulty capturing these local markets without providing local publishers and advertisers a means to avoid engaging in relationships with multiple carriers in order to capture the desired users. In addition, carriers, who are in constant aggressive competition with each other, have little motivation to share access to their networks or customer bases with other carriers. This presents opportunities for third parties to interact directly with publishers and advertisers in a common way, while also providing interfaces to deliver content through multiple carriers based on each carrier's unique interfaces, without requiring the publishers or advertisers to be knowledgeable about these interfaces.

In addition to considering mobile advertising from the advertiser/publisher's and carrier's perspective, it is also helpful to consider the user's perspective. Despite the growth in mobile content delivery, mobile device capabilities and service capabilities and costs vary widely. Bandwidth is generally precious and download speeds vary, necessitating limiting the size/quantity of content delivered. Device support for various screen sizes, resolutions, fonts, and the like also vary widely, embedded media player capabilities are not consistent, and there is a wide mix of user interfaces, bandwidths, and complexity in current mobile technology. Likewise, because of the small size of most mobile devices text entry capability is often limited and cumbersome, making responses difficult, and mobile browser functions are typically limited. For example, mobile browsers typically cannot execute scripts and similar functions, and many different mobile browsers having varying features and functions exist on the market today.

Because mobile display screens are typically small, the advertising itself should not be disruptive. This necessitates relying on the ad's relevancy rather than large text, flashing graphics, or other "in your face" tactics. Also, carriers are sensitive to subscriber and service churn, and will ultimately want to control content delivered over their networks. Since the mobile phone is a personal device, users will be more sensitive to privacy concerns, and content providers and advertisers must also be sensitive to use of user profiling and desire to opt-out of receiving content. This suggests providing mechanisms for allowing users to opt-out, as well as for maintaining user privacy and anonymity if desired.

Despite these concerns, it is clear that mobile phones offer some unique advantages over other modes of Internet content delivery such as via computers. Since a mobile phone is a personal device, the probability that requests coming from a particular phone are being made by the same user is high. In addition, it is also probable that the same user is making all or most requests from the same device. Also, with the assistance of current and developing location technologies, real-time knowledge of users' locations makes location-based services much more attractive than previously used IP based geo-targeting. This allows for more direct and granular contacts with users where a user's location relative to an advertiser's products or services is important, thus making the advertiser's content immediately relevant and potentially compelling. Also, although mobile display screens are typically small, which may limit their presentation capabilities, the small size also provides a focus for users' attention so that content can be easily digested.

Consequently, information about users' interests may be used in conjunction with new mobile technology to give advertisers extremely precise targeting of users, allowing content, including advertising, to be sent only to people who find it relevant. For example, a user may listen to a downloaded Bob Dylan song and purchase books about Bob Dylan, ringtones, or tickets from a classified advertisement. This information could then be provided to a centralized management system where it may be combined with geographic, network, device and temporal information to provide micro-targeting of relevant additional content and advertising to the user (i.e., allowing the system to become the "last-mile" for advertisers/publishers to provide highly focused content delivery). In addition, bandwidth characteristics may be obtained, allowing determination of the type of content a device supports. For example, some devices may be capable of supporting only text or banners, whereas others may be capable of receiving a trailer or videos. Knowledge of device capabilities enables providing device specific optimized content provisioning.

A mobile content management and distribution system (also denoted herein as a Mobile Dashboard) configured to address the above issues as well as others can provide benefits to advertisers, publishers, carriers, mobile device users, as well as others.

Embodiments of the present invention address these and other problems by providing content providers with, among other features, a carrier-agnostic interface designed to eliminate the need to deal with multiple wireless carriers in different ways, as well as identification and collection of personal characteristics of users to help content providers target the "right" customers. Such personalization information may be combined with temporal, geographic, and other user information to further assist advertisers in targeting customers. Content may be delivered to users in a format appropriate to their particular mobile devices and networks based on the above and other characteristics and criteria. Users may also be provided with means for participating in the mobile Internet by creating sites tailored to their personal interests (i.e., a user blog or personalized web page). These sites may, for example, contain information from trusted publishers along with user supplied information, such as user interests and comments, to implement a form of social networking for media companies.

Embodiments of the inventive system may comprise features including: providing all necessary connections and agreements to deliver, create (i.e. sponsored SMS, MMS, etc.) and receive data, content, and advertising between carriers and publishers; accounting systems for tracking all exchanges of advertising and reports on revenue shares and necessary distribution and reporting (i.e. for specific campaign measurement); a local content gateway allowing carriers to offer content and advertising from all advertisers, ad agencies, and publishers, irrespective of size, location, or technological capabilities. Exemplary embodiments may include a full suite of mobile publishing and advertising tools, systems, and vertical applications for publishers who need or can benefit from them.

System Configurations

Attention is now directed to FIG. 1a, which illustrates a high-level system view of an embodiment of a mobile content system 100 according to aspects of the present invention. As illustrated in FIG. 1a, content providers 102 are provided one or more interfaces 117, 118, to a mobile content organization and distribution system (also denoted herein for brevity as a "content distribution system" or merely "system") 120. Content providers 102 may include local 104 and national 106 advertisers providing content (content as used herein may include various content provided to users as well as advertising) directly or indirectly to content distribution system 120. Content may also be provided through one or more content publishers 110 such as local publishers, and/or through advertising agencies 116, and/or through other third party content providers 114.

In an exemplary embodiment in accordance with FIG. 1a, content publishers 110 are the owners of the content. The content typically includes content items such as news clips and stories, reviews (such as product reviews, services reviews such as restaurant reviews, and/or other reviews of products and services), breaking news, images, image galleries, stories, advertisements, videos and the like. The content publishers 110 have relationships with local advertisers 104 and/or national advertisers 106. In addition, third party content providers may be included to re-sell content to publishers and/or distribute content through their own applications. Third party content providers 114 have relationships with ad agencies 112, which have relationships with national advertisers 106. In addition, third party providers may have direct relationships with national advertisers 106. Local advertisers 104 and national advertisers 106 can have advertisements stored on one or more of their own or others' local servers 115 and/or on one or more ad database servers 116 and/or 128 or other databases (not shown). These ad database servers may be located internally to system 120 and/or externally as shown in FIG. 1a.

Content distribution system 120 may comprise one or more modules to provide functionality related to content creation, uploading and downloading, management, user selection, and other features and functions as described and illustrated herein with respect to advertising and content delivery. These modules may comprise hardware, software and/or hardware software combination configured to implement the varied functionality described and illustrated herein. Module components may include one or more computer systems including computer processors/servers, memory or other storage devices, interface devices, peripheral devices, displays, operating systems, application programs and/or other computer systems, programs or associated devices.

Figure 6:
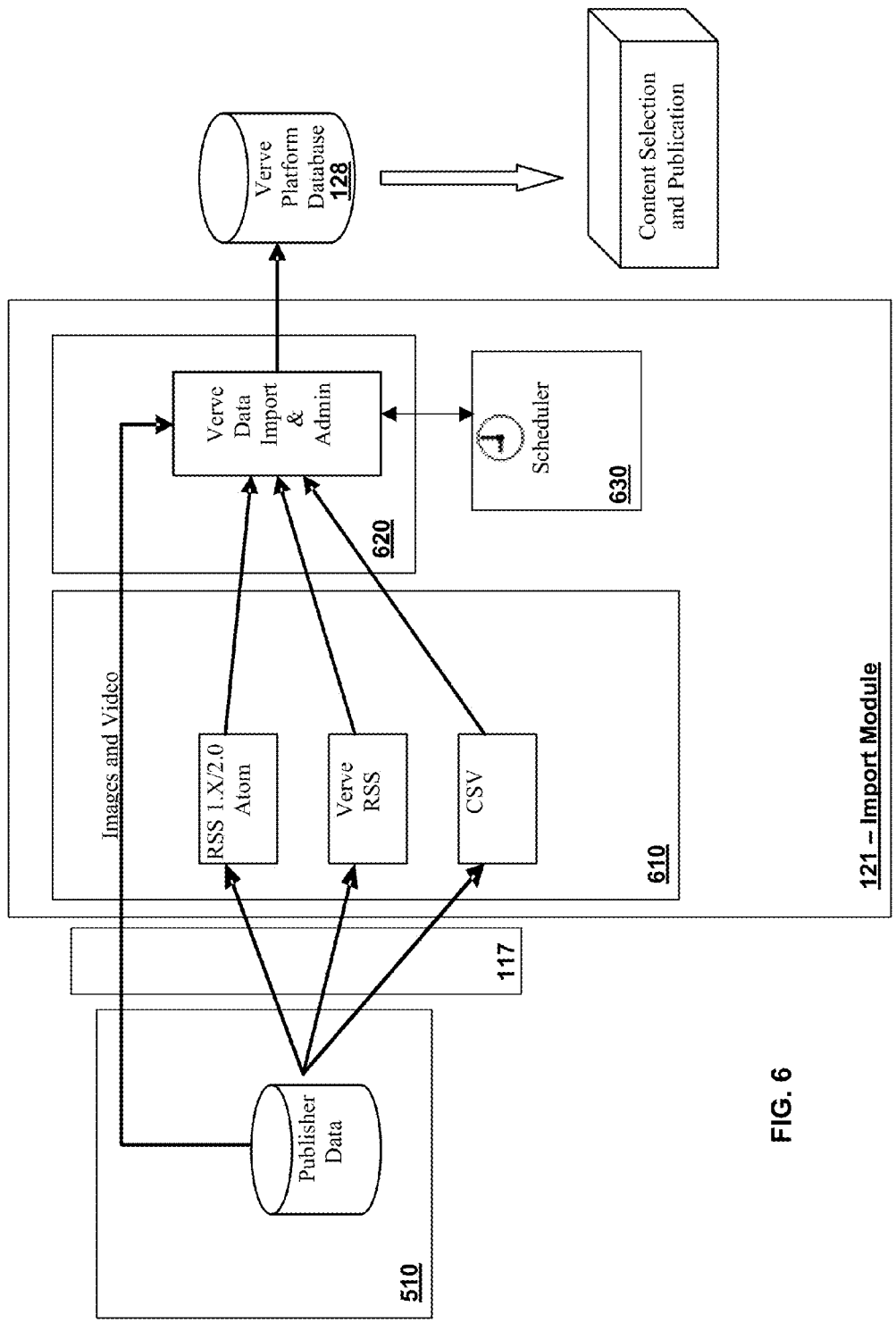
FIG. 6 illustrates an embodiment of advertising/content provision in accordance with aspects of the present invention.

Content publishers 110 may interface with content distribution system 120 through one or more interfaces 117 to one or more importer modules 121. Interfaces 117 may be configured to communicate via HTTP, FTP or other types of communication mechanisms such as are known or developed in the art. The importer modules 121 may be configured to provide access to one or more databases 128 as is further illustrated in FIG. 6. Likewise, third party content providers 114 may also interface with content distribution system 120 through one or more interfaces 117 to one or more importer modules 121. As shown in FIG. 6, publishers or third party content providers can provide publisher data 510 stored on one or more servers or other data storage media to one or more Verve platform databases 128 through interfaces 117 and import module 121. Acceptable formats of communication between the system 120 and publishers may include a variety of formats such as CSV format, RSS format, Atom format or other formats known or developed in the art. Format configuration may be facilitated by administrative functions such as are provided by a mobile dashboard module 124 as shown in FIG. 1a. In addition, content retrieval may be automated on a regular or non-regular basis in conjunction with a scheduler 630.

In addition, local advertisers 104, national advertisers 106 and/or ad agencies 112 may be provided with one or more interfaces 118 to a Verve ad management network module 122. Ad management module 122 is configured to select and serve targeted ads to users 140. This functionality may also be denoted herein as "AdCel" functionality. Selection is typically done to satisfy one or user customization criteria related to the user, such as providing an appropriate ad for a specific user based on a specific device and interest, at an appropriate time and location. Any or all of these criteria may be used to generate the particular ad. Additional details regarding embodiments of ad selection and targeting are further described with respect to FIG. 14. In general, AdCell management is configurable by a publisher using administration functions of the mobile dashboard module 124 as shown in FIG. 1a.

System 120 may also include one or more content and presentation modules 123 configured to extract appropriate content from one or more databases 120, reformat it according to requirements such as user device capabilities, user selections or preferences or other criteria, and facilitate sending it to the user's device through the associated carrier (130a-130d) and/or through other network providers 170 and/or through third party content delivery 160. It is noted that modules 121, 122 and 123 are provided for purposes of explanation, not limitation, and other modular configurations implementing the same or similar functionality may alternately be used.

Interfaces 117 and 118 may be configured to allow content providers to access content distribution system 120, create content for distribution, provide content or other information to content distribution system 120, receive content and information from content distribution system 120, allow publishers to configure and control advertising and content distribution management campaigns, as well as provide connectivity, interfaces, GUIs, monitoring, reporting, accounting, and other features between content providers 102 and content distribution system 120. Content distribution system 120 is provided in part to facilitate connectivity to content providers and therefore as features and functions are added content providers will automatically be provided with the feature updates. It is noted that while in some embodiments content distribution system 120 is configured as a standalone system, in other embodiments the features and functionality of content distribution system 120 may be integrated into content providers' Content Management Systems (CMS) so that it appears as a single unified system from the providers' perspective.

Content distribution system 120 also provides one or more interfaces 122 to one or more mobile carriers 130 or other network providers 170. As used herein, other network providers may include any of various non-carrier providers, such as ISP providers, Satellite providers, Wi-Fi or Wi-Max providers, long term evolution (LTE) providers, or other types of providers using known or developed non-carrier interfaces. For example, content may be delivered to a user have Wi-Fi (or other) connectivity through a cell phone, PDA, or other portable device, at a particular location or building where Wi-Fi (or other) connectivity is available, either where the user's associated carrier is also available or in places where no carrier connectivity is available. This option may be selected by the user in a customization process associated with system 120, where the user selects particular ways of content provision such as is further described below.

It will be noted that FIG. 1a illustrates four mobile carriers 130a-130d, however, the number of mobile carriers is not so limited and fewer or more carriers may be accommodated. For example, in the United States there are four primary mobile carriers: Sprint, Verizon, T-Mobile, and AT&T. In one exemplary embodiment one or more interfaces may be provided to each of these carriers as well as others (such as Alltel, Cricket, US Cellular, etc.). It is likewise noted that other carriers and/or configurations are possible and fully contemplated herein. For example, in some embodiments, alternate providers 170 such as satellite providers, WiMax providers, or others capable of providing wired or over the air (OTA) service to mobile devices may be included instead of, or in addition to, cellular providers. Interfaces 122 may provide means for provision of information to one or more wireless or other carriers based on their unique systems and interfaces, and may allow content distribution system 120 to receive information from the carriers regarding user device characteristics, content provision, performance, responses, and other parameters. In accordance with one aspect of the present invention, it may be advantageous for content providers to be given such a carrier agnostic interface in order to avoid having to custom format content for the increasingly diverse number of device types and connectivity associated with the various users and associated carriers.

In general, mobile carriers 130 operate wireless communications systems that provide wireless connections 132 to multiple users 140. Such wireless communications systems may operate in accordance with standardized protocols such as, for example, CDMA, GSM, or other wireless technology (i.e., 802.11, WiMax/802.16, 2.5G, 3G, 4G, LTE, etc.) or instead may comprise proprietary systems. As noted previously, in some embodiments, other providers 170 provide similar functionality in addition to or in place of that provided by carriers 130 to associated mobile devices. In addition, in some embodiments wired, rather than wireless, connectivity may be facilitated to provide connectivity through fully or partially wired connections to the users 140. It is noted that communication technology is constantly evolving, and therefore newly developed standards may also be used within the spirit and scope of the present invention.

The communications systems operated by carriers 130 may provide users 140 with voice or text content, mobile web content, email, SMS & MMS text messages, video, podcast, flash, mobilTV, and/or other features and services as may be offered by advertisers/publishers through the associated carriers 130 or other providers 170. Content from content distribution system 120 may be provided to users 140 through their respective carrier or carriers, and content distribution system 120 may also collect, store, analyze, process, and distribute information from carriers 130 and users 140. Such information may also be distributed to carriers 130 and/or content providers 102. As used herein, carriers 130, other providers 170, and their associated users 140 may be grouped into a common classification denoted as clients 180, which includes the carriers, other providers, and their associated users.

In addition to providing content to users 140 through carriers and other providers, content distribution system 120 may also have one or modules or interfaces 126 configured to provide information and content to one or more third party content providers 160, which may then provide content to users through carriers 130 or other network providers 170, and may be configured to receive information from third party content providers, wherein the third party providers can then interact directly with one or more associated carriers 130. For example, as noted previously, carriers may establish relationships with one or more third party providers. These third party providers may, among other functions, take advantage of less expensive "remnant" inventory when publishers' own ad sales are insufficient to fulfill the demand, and provide this inventory to users directly through their respective carriers. This approach may be used to offer publishers additional time to adjust to mobile advertising and educate their sponsors, while still allowing them to see a return on editorial content.

Figure 1B:
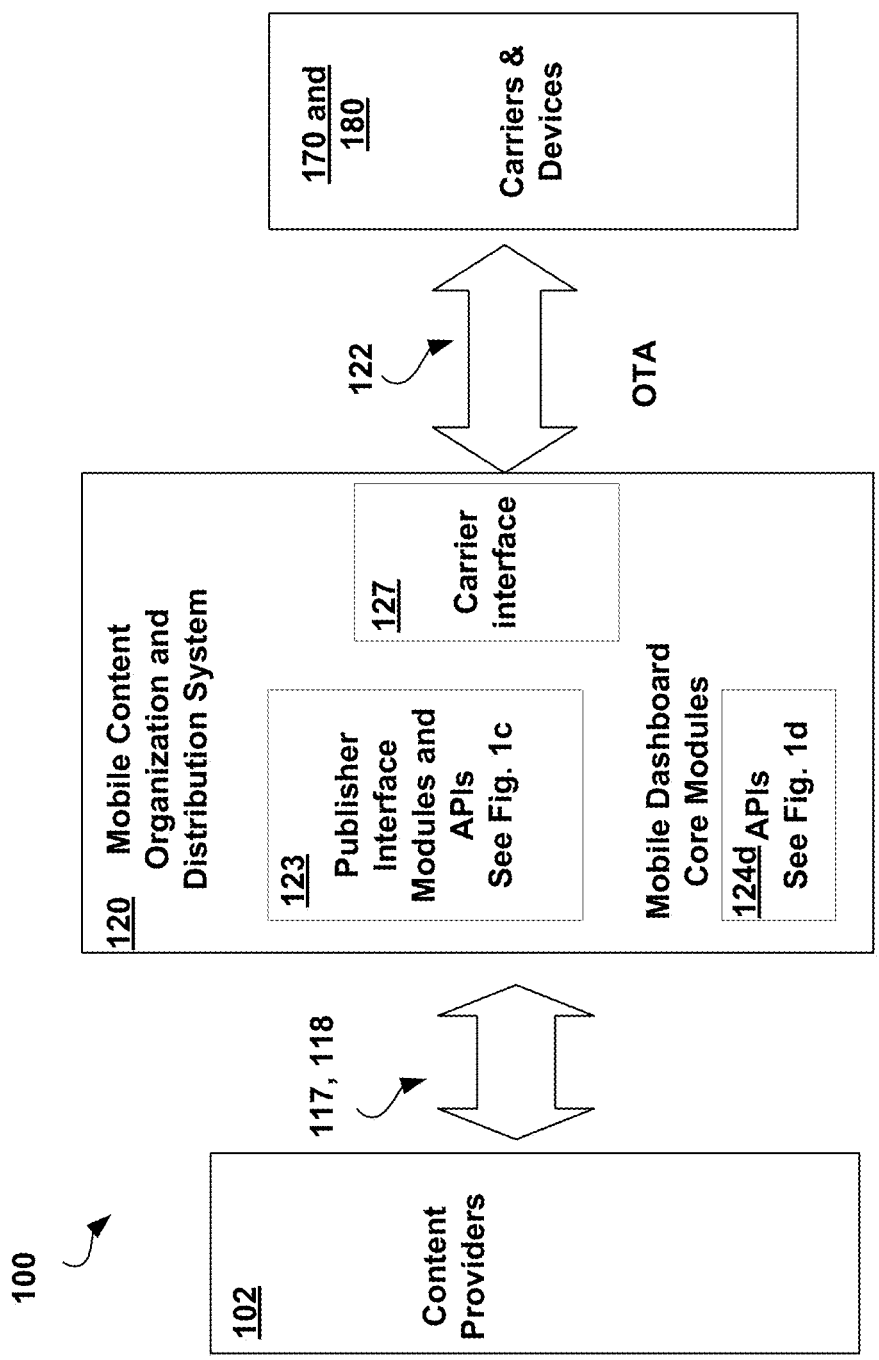
FIG. 1b illustrates additional aspects of an embodiment of a system in accordance with aspects of the present invention.

FIG. 1b provides another view of an embodiment of system 100 illustrating additional aspects of an exemplary embodiment of a content distribution system 120. As shown in FIG. 1b, content distribution system 120 may comprise modules including hardware, software, as well as a combination of hardware and software configured to provide functionality related to various aspects of system 100. In some embodiments, content system 120 is designed to be integrated with a publishers CMS. This can be done in the form of a plug-in to the CMS using the APIs shown in FIG. 1d. These APIs may include API's shown in FIG. 1c as content interface APIs 123 and/or dashboard core APIs 124d as shown in FIG. 1d.

Content interface module 123 may further include one or more submodules configured to interface with publishers/advertisers 110 to provide GUIs, allow configuration, content creation, control and management of advertising campaigns, support for uploading and downloading of content and other data and information, receipt and transmission of reports, content, data and other information, and other functions related to engaging in advertising or content distribution campaigns, managing campaigns, receiving reports and other information related to those campaigns, as well as other related functions.

In an exemplary embodiment content interface module 123 includes multiple application programming interface (API) submodules implementing various features as are further described below, as well as others.

Figure 1C:
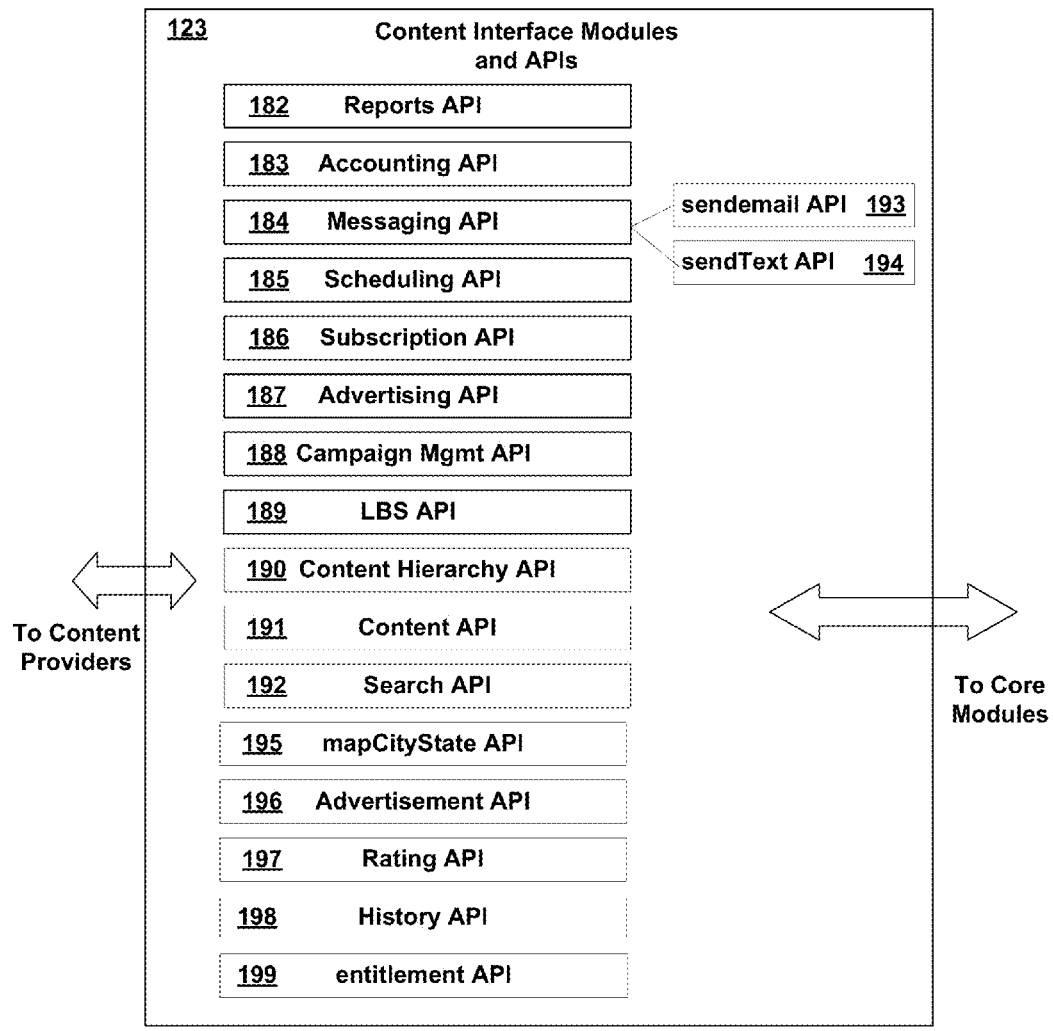
FIG. 1c illustrates an embodiment of a set of APIs for publisher configuration.
Figure 1D:
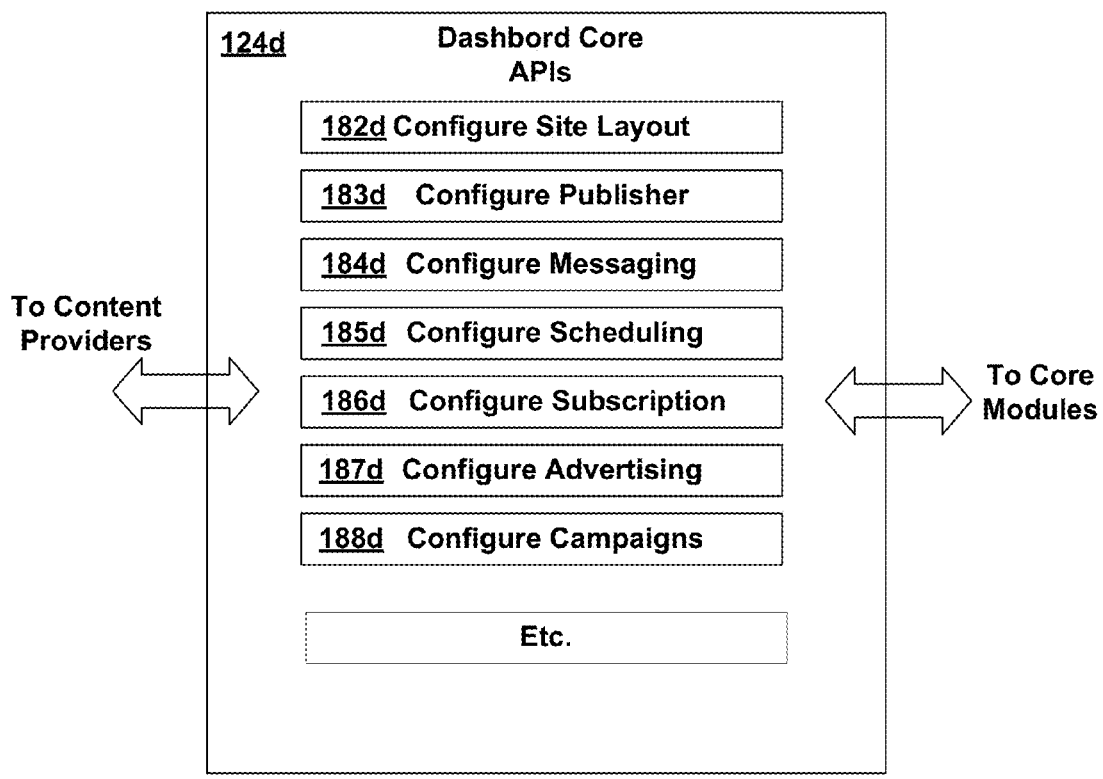

If a third party content provider wishes to define a different look and feel to the default Verve system or create their own client they can use the set of APIs illustrated in FIG. 1c to extract the content information they need. FIG. 1d APIs may be provided to enable a plug-in to a CMS system. Accordingly, FIG. 1c and FIG. 1d define a set of API's for integrating the mobile dashboard module and/or for extracting data from the system 120 to create a third party client with a specific look and feel, as an extension to system 120. For example, API 190 (Content Hierarchy API), API 191 (Content API) and API 192 (Search API) provide an interface to the content module 123 as shown in FIG. 1a. API 196 (Advertisement API) provides an interface to management network module 122. APIs 182 and 183 (Reports API) and (Accounting API) provide an interface to facilitate fetching associated information from system 120. APIs 187 and 188 (Advertising and Campaign Management) provide an interface for fetching a targeted ad from the management network module 122. API 199 is an interface for facilitating content protection and providing accurate content reporting. API 185 provides an interface to facilitate access to scheduling functions to allow retrieval of content on a regular basis. API 186 provides an interface to facilitate allowing a user to subscribe to a regularly scheduled message. API 189 provides an interface to facilitate receiving location based (LBS) information. API 195 provides an interface to facilitate return of information related to a neighborhood, city and state of a user given the user's longitude and latitude. API 197 provides an interface to facilitate return of rating numbers of an article. API 198 provides an interface to facilitate return of a user's history (i.e. links the user has browsed). Modules implementing the associated features and functions described with respect to these APIs are also typically provided in system 120.

In some embodiments a messaging API module 184 may be constructed in a modular manner to support pluggable integration and enhancements. Aspects of an embodiment are further described as follows. At the core of the messaging API is the concept of a "Message." A Message in it's simplest form contains a list of recipients and a sender. The most common implementation of a Message in a typical embodiment is an "SmsMessage." SmsMessages have a text body, a "from" field, and an optional "PushUrl." The PushUrl is used to send http links to mobile devices. SmsMessages may be sent to "PhoneAddressableRecipients," meaning recipients with a phone number.

Figure 5:
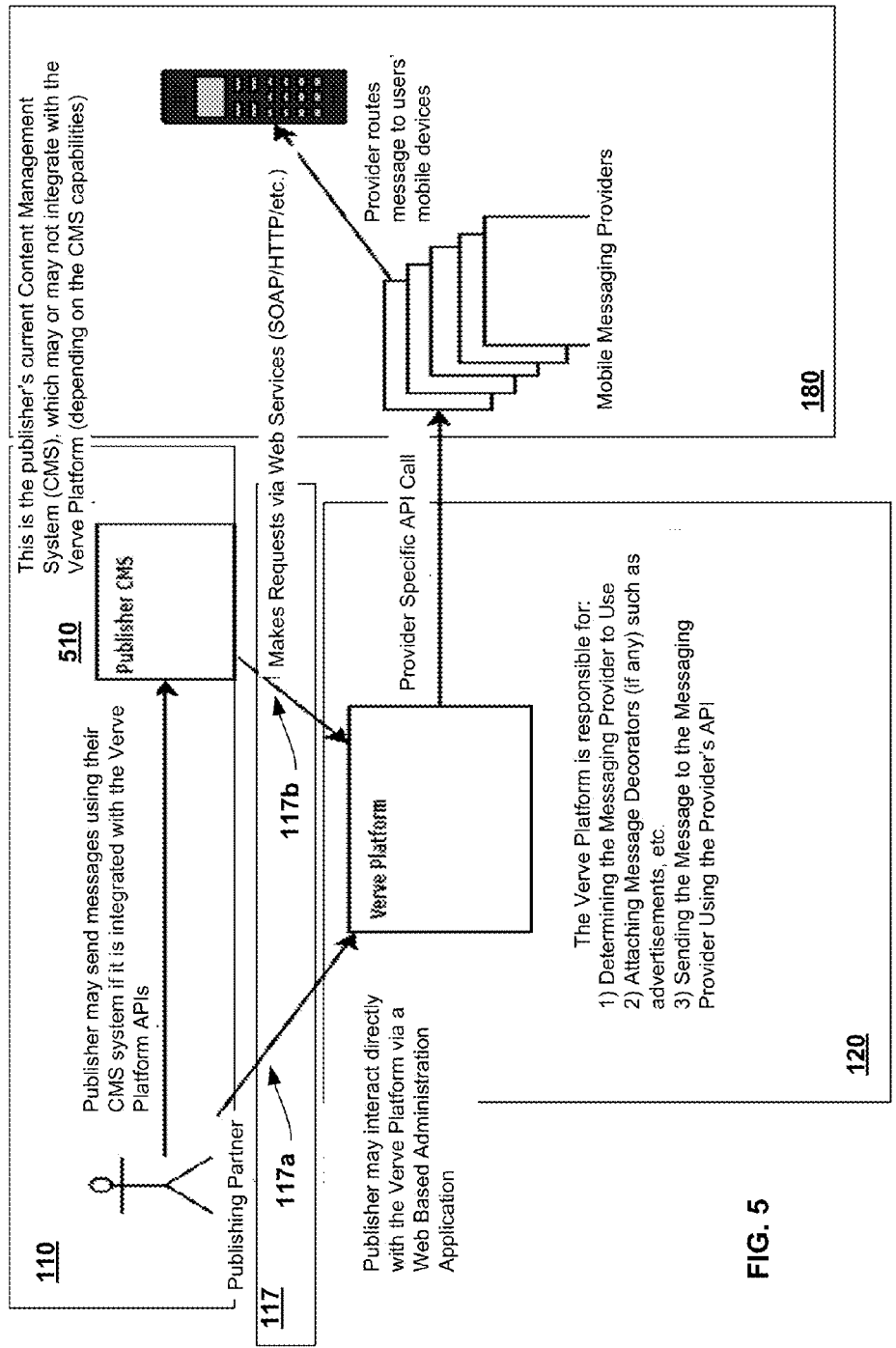
FIG. 5 illustrates an embodiment of message initiation in accordance with aspects of the present invention.

Messages may be sent via a MessageSender interface. The MessageSender interface itself typically knows nothing about the Message type or how it is to be sent, however, implementations of the MessageSender define these things. For example, Mqube may be used as an SMS aggregator. Then an MqubeMessageSender may be created which takes messages and sends them. In addition a TwoChatterMessageSender and a ClickatellMessageSender may be used to perform similar functionality. Additional details of this messaging are illustrated in FIG. 5.

The MessageSender interface gets the request to send a message, however it still must know which MessageSender to route the message through. This may be done through a lookup to determine, based upon certain criteria, which sender to use. The criteria may include properties such as: MessageFunction—what's the purpose of this message?; Sender—does this sender require a specific message sender?

Because a typical system must deal with integration of external services, it may be important to handle situations when the external services are not available. The messaging API may be configured to have the ability to store & resend messages upon unsuccessful attempts. It may also be configured to attempt sending via different aggregators/transport mechanisms in the event of failure. The status of all message sending attempts can easily be determined through logs of the attempts.

Content distribution system 120 may also include a Mobile Dashboard Module 124 configured to provide administrative related functionality. Mobile Dashboard module 124 is primarily configured to facilitate provisioning, configuration and entitlement. It may also be configured to provide a reporting and auditing view of the site, as well as providing other administrative functionality. Module 124 may include features allowing publishers to configure the system 120 to enable mobilizing their content, sending messages to their users and monetizing their content through advertising. In accordance with one embodiment, module 124 may include features enabling publishers to integrate system 120 directly with their content management system (CMS), such as is shown as publisher's database 510 in FIG. 1*a*. A set of APIs 124*d* as shown in FIG. 1*d* may be provided to facilitate this integration. API 182*d* is an interface for facilitating publisher configuration of site details such as channel names, ordering and the like. API 183*d* is an interface for facilitating publisher configuration, such as enabling site details, templates, and the like. API 184*d* is an interface for facilitating access to messaging functions for purposes of configuration and scheduling future messages to be sent to users. API 185*d* is an interface for facilitating access to a scheduling module (i.e., module 630) for control of repetitive ingestion of feeds or further scheduling messages. API 186*d* is an interface for facilitating configuration of user message subscription. API 187*d* in an interface for facilitating configuration of advertising in conjunction with modules such as advertising management module 122, ad delivery subsystem 230, and ad targeting subsystem 250. API 188*d* is an interface of facilitating configuration of ad campaigns, include the burn rate and flight, impressions, etc, for a specific publisher. Other APIs provided additional functionality such as authentication and user login may also be provided. Modules implementing the associated features and functions described with respect to these APIs are also typically provided in the mobile dashboard module 124 and/or elsewhere in system 120, such as in the subsystems shown in FIG. 2.

Content distribution system 120 may also include a carrier interface module 127 configured to provide an interface to one or more carriers or other providers and their associated users/subscribers' mobile devices (clients 180). Carrier interface module 127 may be configured to provide a carrier-agnostic interface to the associated carriers and other providers so that content from content providers may be stored and processed in content module 123 and then seamlessly configured and distributed to clients 180 through carrier interface 127.

Attention is now directed to FIG. 2 which illustrates additional details of an exemplary embodiment of the present invention. As shown in FIG. 2, content distribution system 120 may include multiple modules and/or subsystems in addition to or in place of those shown in FIG. 1*b*, configured to provide functionality associated with various aspects of the present invention. The modules as shown in FIG. 2 will typically be included within the general submodules 121, 122, 123, 124, and 126 as illustrated in FIG. 1*a*, however, other configuration are possible and contemplated herein.

These subsystems may include a provisioning and trafficking subsystem 210 configured to interface with one or more publishers 110 and provide publishers with access to system functionality such as graphical user interfaces (GUIs), uploading content and information, sending content and information to publishers, databases for campaign information, management, accounting, advertising media storage, and related functionality. In a typical embodiment provisioning and trafficking subsystem 210 may be included within module 123 as shown in FIG. 1*a*. Provisional and trafficking subsystem 210 enables configuration of the partner and the ad networks available to this partner, as well as storage of ad media and campaign and accounting information.

A reporting and inventory subsystem 220 may be provided to receive and process report requests and report data and information, manage and generate reports, inventory reporting results, provide data warehousing, and provide related functions. Reporting and inventory subsystem 220 may be configured to interface directly or indirectly with provisioning and trafficking subsystem 210 as well as with other subsystems including those shown in FIG. 2. In a typical embodiment reporting and inventory subsystem 220 may be included within content Dashboard module 124 as shown in FIG. 1*a*. Reporting and inventory subsystem 220 facilitates providing information such as reports on the number of page views, the number of uniques, the number of hits, etc. per publisher and/or per site as well as other statistics that may be important to an ad platform. Reporting and inventory subsystem 220 can also be used for various auditing purposes and can report on ad inventory and burn rate. The reporting functionality may also be related to the 124*d* API illustrated in FIG. 1*b*.

An ad delivery subsystem 230 may be provided to implement one or more ad delivery sub-systems or modules. Ad delivery subsystem provides the capability of delivering different types of ad formats based upon input from other modules such as modules 210, 220, and 250. For example, modules may be provided to receive information and content from provisioning and trafficking subsystem 210, ad targeting and selection subsystem 250, action and measurement subsystem 260, or from other subsystems or modules including those shown in FIG. 2. Modules within ad delivery subsystem 230 may include a WAP banner module, a WAP text module, an SMS text module, an MMS module, a mobile video module, or other modules associated with delivery of content to carriers and their associated subscribers. Ad delivery subsystem 230 provides a mechanism for enabling the ad platform to select the right ad for a specific user, at a specific time and based on a specific device and/or network.

Ad delivery subsystem 230 may be configured to interface with carriers or other providers through interface 122 as shown in FIGS. 1 and 2, or through other means known or developed in the art, based on information and content associated with a particular user or users. Ad delivery subsystem 230 may also be configured to receive information from clients 180 through interface 122, such as requests from users. Content delivery and request information may be routed to and from ad delivery subsystem 230 directly or through an anonymizer module 235. Anonymizer module 235 may be included to allow content providers to micro-target users with relevant information without revealing that person's identity. In a typical embodiment ad delivery subsystem 230 may be included within module 123 as shown in FIG. 1*b*, or in other core modules within system 120.

An ad targeting and selection subsystem 250 may be provided. This functionality may be included in or associated with ad management network 122 as shown in FIG. 1*a*. Ad targeting and selection subsystem 250 may include one or more modules in the form of a targeting database, real time ad targeting engine, subscriber state database, or other modules and subsystems. Ad targeting and selection subsystem 250 may be configured to interface with other subsystems as shown in FIG. 2, including provisioning and trafficking subsystem 210, reporting and inventory subsystem 220, ad delivery subsystem 230, action and measurement subsystem 260, external subscriber data subsystem 270, or other subsystems or modules as may be provided in content distribution system 120. In a typical embodiment, ad targeting and selection subsystem 250 may be included within dashboard module 124 as shown in FIG. 1*a*. In a typical embodiment, subsystem 250 includes a series of business rules that enable improved targeting and maximization of ROI.

An action and measurement subsystem 260 may be provided. Action and measurement subsystem 260 may comprise one or more modules configured to provide and measure functionality related to collecting, monitoring, analyzing, and responding to content provisioning. Action and measurement subsystem 260 may include modules to monitor an externally branded WAP site, click to call gateway, provide SMS coupons, provide location and/or direction lookup, or other related functions. Action and measurement subsystem 260 may be configured to send and receive content, information, and data through interface 122 to mobile clients 180. Action and measurement subsystem 260 may also be configured to provide content, information, and data to reporting and inventory subsystem 220 such as delivered impressions and responses, including the raw date from a specific user clicking/selecting information. Such data may be stored by reporting and inventory subsystem 220 and/or may be used by reporting and inventory subsystem 220 to generate reports or other information that may be provided to publishers 110. In a typical embodiment action and measurement subsystem 260 may be included within dashboard module 124 and/or within carrier interface module 127 as shown in FIG. 1*b*.

An external subscriber data subsystem 270 may be provided. External subscriber data subsystem 270 may include servers, databases, or other technology configured to store data associated with publishers, carriers, users, or other entities. Subsystem 270 is the external $3^{rd}$ party subscriber data. With this data, targeting and selection of the ad may be improved. For example, $3^{rd}$ party databases such as operations can be used for improved targeting. In one embodiment external subscriber subsystem 270 includes a publisher's subscriber database which may store associated data, as well as a mobile carrier subscriber database with associated data. In a typical embodiment external subscriber data module 270 may be included within dashboard module 124 as shown in FIG. 1*b*. External subscriber data subsystem 270 may be used to provide subscriber specific information when selecting one or more ads to be targeted to a particular user such as is further described with respect to FIGS. 8 and 9.

Figure 3:
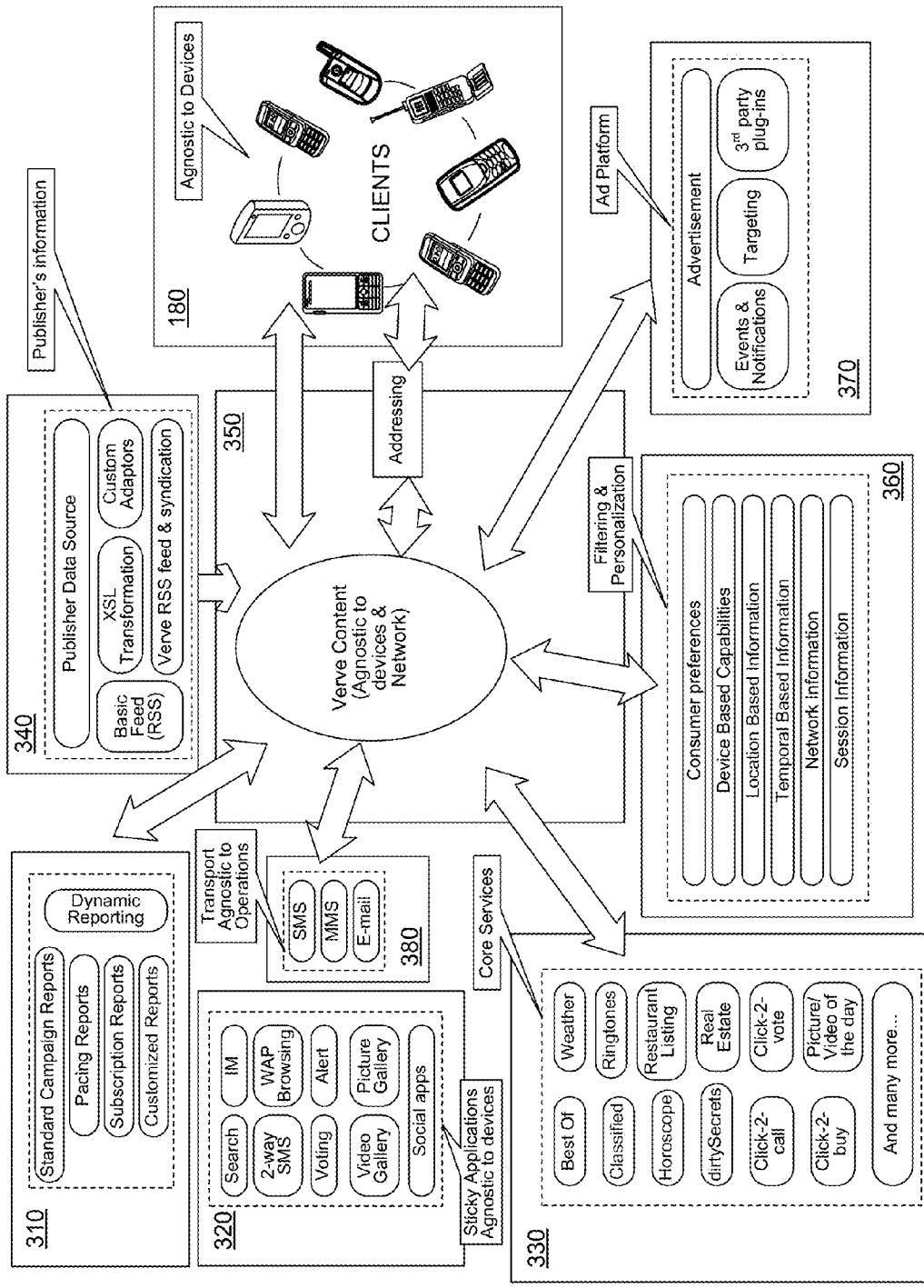
FIG. 3 illustrates an embodiment of a system in accordance with aspects of the present invention.

Attention is now directed to FIG. 3 which illustrates some exemplary application programs and modules related to various features and functions that may be provided by embodiments of the present invention. Modules as shown in FIG. 3 may be configured to operate within one or more subsystems as shown in FIG. 2. Embodiments of a system in accordance with the present invention may include a centralized or distributed content repository 350 containing content, data, and information associated with content distribution and management. In addition, embodiments may include one or more reporting modules 310. Such modules may include one or more functional submodules providing various reports such as standard campaign reports, pacing reports, subscription reports, or other reports or related information. Embodiments may include one or more "sticky application" modules, wherein such modules may include a range of "sticky applications" such as search applications, instant messaging (IM), 2-way SMS, WAP browsing, voting and contests, user personalized alert generation and distribution, video, picture, audio, or other content galleries, social applications such as a MyMobile Page application, or other applications. As used herein, the term "sticky applications" refers to user applications that are socially oriented and/or intended to keep users returning to the applications. For example, a user may enjoy the interface of a particular application and/or the information provided and will therefore keep returning to get responses/destinations.

Embodiments may include a core service module 330 comprising a set of applications/modules allowing users to access information and content and provide user inputs and requests. Such applications may include services known in the art, such as BestOf, Weather, Classified Ads, Ringtones, Horoscope, Restaurant Listings, "DirtySecrets," Real Estate, Click 2 Call, Click 2 Vote, Click 2 Buy, Picture, Video, or Audio Galleries, as well as a wide range of additional modules.

Embodiments may also include a filtering and personalization module 360 comprising one or more submodules configured to receive and send information and data associated with publishers, carriers, users, or system operation. Submodules may include consumer preference modules, device based capabilities modules, location based information modules, temporal based information modules, network information modules, session information modules, or other similar modules.

Embodiments may also include one or more core ad platform modules 370. Ad platform modules may further include multiple sub-modules providing functionality associated with various aspects of content management systems including advertisement, events and notifications, targeting, storage and management of third party plug-ins, as well as other functions.

Embodiments may be provided with a content importer module 340 configured to receive and send content, information, and data from external publisher sources. Publisher data may be provided through means known in the art including RSS feeds, XSL transformation (XSLT), Custom adaptors, or other means known in the art. Data provided by the content importer module may be in the form of a basic RSS feed and/or may be a custom or proprietary RSS feed with syndication. For example, data received from a content provider may be in a different format such as a flat file or XML file. This data may then be transformed to a fully contained RSS feed tailored for mobile applications.

Embodiments may also include one or more transport modules 370 to receive and distribute content and information to publishers. Content may be delivered via SMS, MMS, E-mail, or other means known in the art. Content provided by transport module 370 may be provided in a fashion that is independent of a particular carrier so that a publisher can receive and send advertising and content enabled device. For example, advertisement may be micro-targeted as it is input based on parameters such as network type, device capabilities, geographical/location information, temporal information, session information, consumer profiles, as well as other parameters with the goal of providing geographically oriented contextual information and advertising optimized for a particular user.

Figure 4:
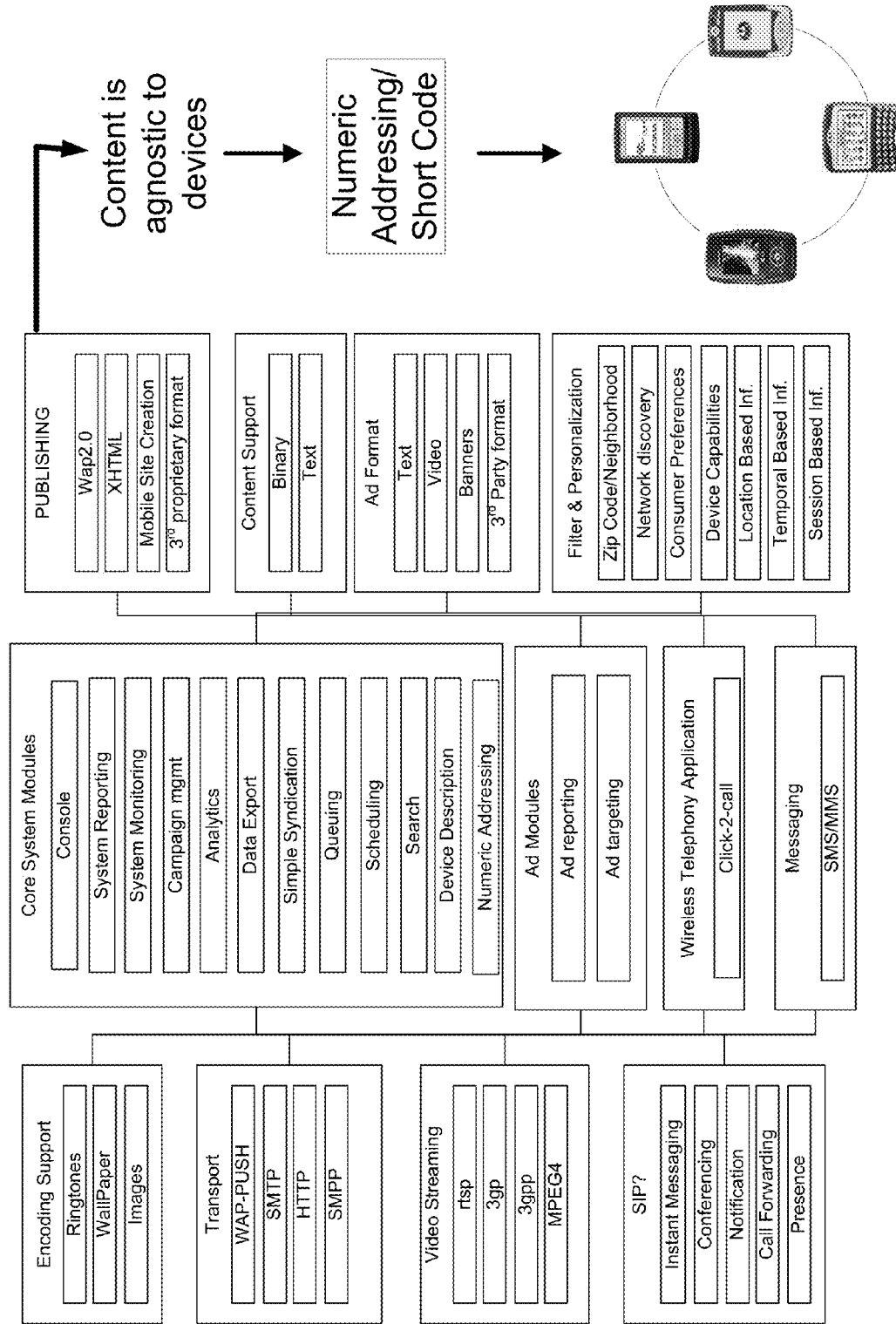
FIG. 4 illustrates an embodiment of a set of system modules and applications in accordance with an embodiment of the present invention.

FIG. 4 provides an illustration of an alternate embodiment of module configurations of a system 120.

Publisher Interface Modules and Functions

Systems in accordance with the present invention may include one or more interfaces to allow publishers/advertisers to provide content, manage advertising campaigns, monitor advertising campaign performance or results, or perform other functions related to content distribution. In an exemplary embodiment, an interface 117 as shown in FIG. 1a may be provided between content providers 102 and content distribution system 120. The interface may include hardware and/or software comprising one or more modules configured to allow content providers to provide content to content distribution system 120 through publisher interface module 123 as illustrated in FIG. 1b as well as receive content and other information from content distribution system 120.

FIG. 5 illustrates one embodiment of an interface between a content provider 102 and a content distribution system 120 such as may be provided, for example, in publisher interface module 123 as shown in FIG. 1b. As shown in FIG. 5, a content provider 110 may access distribution system 120 through an interface 117 such as is shown in FIG. 1a. Interface 117 may be configured to provide multiple access means for content provider 102 to access distribution system 120. In one exemplary embodiment, one or more importer modules 121 may be provided in distribution system 120 to allow a publisher to interact with the management system via a web browser or web based application interface 117a. In addition, one or more modules 121 may be provided by distribution system 120 to allow a content provider/publisher's content management system (CMS) 510 to interact directly with distribution system 120 to schedule and provide content through interface 117b.

Interactions as illustrated in FIG. 5 may be managed and controlled based on one or more application programming interfaces (APIs). The APIs provide a way to access the core data of the system 120 separate from the presentation of the data. Mobile dashboard 124 provides a set of these APIs as shown in FIG. 1d, and FIG. 1c illustrates APIs for the content, which corresponds to module 123 of FIG. 1a. The content may include an ad as well as $3^{rd}$ party content. Exemplary APIs in a typical system may include one or more of the following: a mobile number lookup API may be provided, allowing publishers the ability to target a single operator by targeting specific users and eliminating the need for users to provide carrier information during web registration, simplifying the registration process and overcoming the issue of users changing carriers and therefore giving the publisher the ability to bill on the mobile user's bill directly. In addition, specific devices, users, networks or combinations may be targeted; a content API may be provided which delivers content hosted by a content management system; a MobileSite API may be provided that enables publishers to create a mobile site using the content management system; a messaging API that delivers a message to one or many mobiles—in a typical configuration key options for sending messages are: one-way SMS, two-way SMS (built-in within the platform and independent of the operators' capabilities to support two-way SMS), premium SMS billing (single charge per download on their bills or recurring monthly charge on their bills), SMS poll template and engine, and the like; a scheduling API may be provided to create, send, delete and retrieve message content (available for both SMS and RSS); a subscriber API may be provided that stores and maintains information by phone number for each subscriber; a profile API may be provided that maintains profile information to enable targeting of subsets of subscribers; a location API (LBS) may be provided to allow the publishers through the Verve Platform to locate the mobile phone user and target them with specific information (e.g. ads or content); a reporting API may be provided to enable the publishers to measure and manage their campaigns; an Ad API may be provided to allow to link ads to publishers' mobile site; a Create a Web Page API may be provided to allow for advertising of mobile sites; other APIs may also be provided. APIs such as those described above as well as others may be based on industry standard such the SOAP protocol for exchanging XML messages over computer networks.

FIG. 6 illustrates one embodiment of a system and process for data transfer from a publisher's CMS 510 to distribution system 120. As shown in FIG. 6, import module 121 may include a content provision module 610 configured to receive content in various formats such as comma separated value (CSV), RSS, or customized or proprietary RSS formats. Publishers or third party content providers can provide publisher data 510 stored on one or more servers or other data storage media to one or more Verve platform databases 128 through interfaces 117 and import module 121. Acceptable formats of communication between the system 120 and publishers may include a variety of formats such as CSV format, RSS format, Atom format or other formats known or developed in the art. Format configuration may be facilitated by administrative functions such as are provided by a mobile dashboard module 124 as shown in FIG. 1a. In addition, content retrieval may be automated on a regular or non-regular basis in conjunction with a scheduler 630. Module 620 will typically be part of the mobile dashboard module 124, where the importer modules 121 are configured to extract data from a publisher's site and insert data into a database in system 120. This process can be automated by tying directly into the publisher's CMS system using the APIs described herein.

Figure 7:
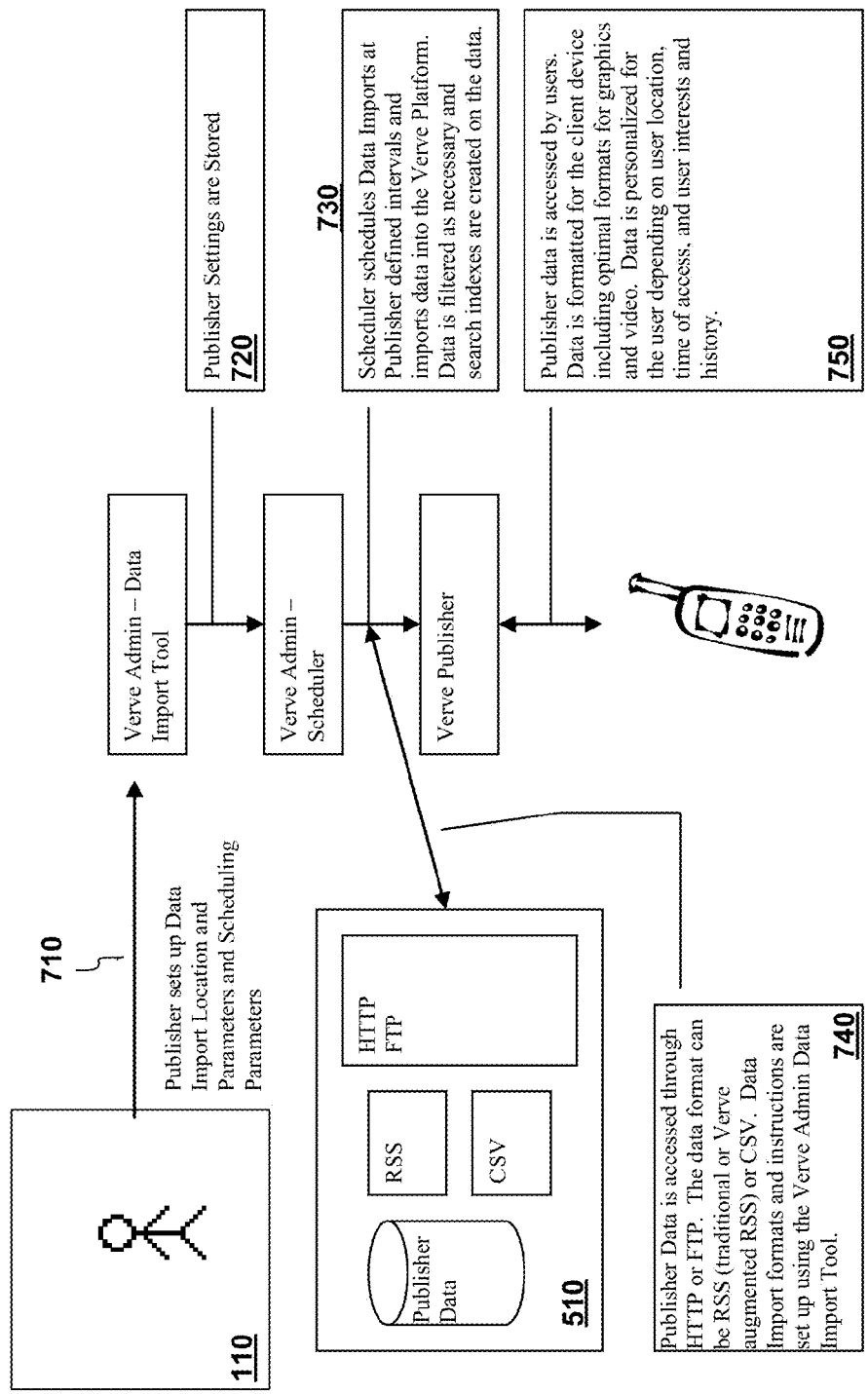
FIG. 7 illustrates an embodiment of a workflow for providing content in accordance with aspects of the present invention.

Attention is now directed to FIG. 7 which illustrates a content import workflow in accordance with an embodiment of the invention. As shown in FIG. 7, a publisher/advertiser 110 first engages with distribution system 120 by setting up a data import location, parameters, and scheduling information at stage 710. Engagement may be provided through interfaces 117 as shown in FIG. 1a. Publisher information and settings may then stored in distribution system 120 at stage 720. An administrative scheduler function may then schedules data import from, for example, a publishers CMS system or publisher's data 510 (as shown in FIG. 6) at stage 730. Data may then be imported at stage 740 via HTTP or FTP, formatted as RSS or CSV. The data may then be processed, users targeted, and data formatted according to particular carrier and/or user requirements based on carrier networks and user device characteristics in stage 750. In a typical workflow, content is personalized for the user based on location, time of day, time of access, and other user specific criteria, such as is further described below with respect to FIGS. 8 and 9.

Content Processing and Storage Modules and Functions

A distribution system 120 may include one or more functional modules configured to implement various functionality as is described with respect to FIG. 1a through FIG. 4 and elsewhere herein. Core functionality may be implemented with modules as are shown in FIG. 1b, along with associated submodules.

In one core function of a distribution system 120, Ads associated with publishers 110 may be selected and targeted to particular users connected through a particular carrier. Selecting an ad (also denoted herein as micro-targeting) may be based on any of a number of user customization criteria including (but not limited to): user (mobile subscriber) preference; users' device capabilities; location information (such as geographic location/position of users); temporal information (such as time of day and/or time user accesses particular mobile device features or functions); carrier/network information; session information; frequency of use; keywords; carrier specific criteria, portal, or other similar or related criteria. For example, based on a user's known interests, location, and the current time, a user may be able to instantly read peer reviews about a particular shop or office they are about to enter, or receive offers from a restaurant on the street they are walking on or heading to (based on, for example, a previously scheduled meeting at a location on that street).

As described previously, typical ads may be configured for distribution and provided so that publishers/advertisers need not be aware of particular carrier and/or device requirements. Exemplary types of supported ads may include banners, interstitials, video, ads embedded in SMS and MMS alerts, click-to-call, as well as ads integrated with third parties such as third parties associated with particular carriers (i.e. third-screenmedia, adhocmobile, etc.). These ads may be selected based on carrier and/or device characteristics that may be obtained in a manner as is discussed elsewhere herein or by other means known or developed in the art.

Along with providing ads, associated functions of a distribution system 120 may include the ability to analyze traffic and hits for more profitable revenue generation, along with functions providing complete sales and inventory forecasting and related functions such as monitoring a user's own profile or a user's friends.

In some embodiments a dynamic reporting capability may be provided via associated modules such as those shown in module 310 in FIG. 3. Site reports may be provided based on a site's historical activity and may be configured to include functions such as ad space activity over time, carrier performance and breakdown, geographic advertisement distribution, device performance and breakdown, and other functions. Data reports may be provided including functions such as sales management data and information allowing optimization of publishers' sales strategy; site management, reporting and forecasting data against price; and other functions such as traffic measurement (CPM, etc.) and behavior of users within a site (for example, the number of users who have clicked on a link on a particular page).

Attention is now directed to FIG. 8a which illustrates an embodiment of a workflow 800 associated with processing a request for content/advertisements. It will be apparent that the stages are shown are for purpose of illustration only and not limitation. Accordingly, other stages or combinations are possible within the spirit and scope of the invention.

In exemplary embodiments content, including advertisements, may be characterized so that content can be associated with and targeted to specific users. For example, some or all advertisements and other content may have categorizations associated with them such as, for example, news and information, food and drinks, ringtones, music, family, etc. In addition, advertisements and other content may include associated device information detailing the particular types of mobile devices the content can be distributed to and/or displayed on. Content may also be categorized by types of networks and/or network capabilities it may be presented to. This may be combined with geographic/location information to determine particular capabilities of users in real time based on their location, network access, device, etc. This categorization may be stored in one or more databases and then used, as for example is described below, to determine appropriate ad and content provision.

In light of this, an embodiment of a content processing process may be employed as shown in FIGS. 8a and 8b. As illustrated in FIG. 8a, content or advertisements may be requested through a request response module 815 at stage 810, typically by a user. Content criteria may be provided from a content criteria module 840 (such as a database or content storage server), wherein content may be categorized by various criteria and parameters such as time, location, user device type, and the like. Once content has been requested, an ad selection module 825 may then be initiated at stage 820 using content provided from an Ad/Content database 850 based on criteria stored in criteria module 840. Database 850 may be database 116 and/or database 128, or other databases as are shown herein. In a typical embodiment, targeted user content will be provided, along with associated targeted advertising content, such as in the form or a boxed ad or banner ad, along with the other content.

Viewing this process at a more abstract level, the ad selection stage 820 may be initiated by the request/response module 815. The request/response module 815 may be initiated when a user requests specific content from a server in distribution system 120. The content may be fetched and formatted appropriately from the server, and then one or more ads may be added to the content in an ad selection module 825 at ad selection stage 820.

FIG. 8b illustrates one embodiment of an ad selection process 800 that may be used by ad selection module 825 to select an advertisement for a specific piece of content and specific user. Selection may begin with a receive query stage 821, where an ad request is received. The request is then analyzed in an analyze query stage 822. Once the query has been analyzed, an appropriate advertisement is identified in an identify advertisement stage 823. Embodiments of additional details of this stage are further illustrated in FIG. 9a. Identify advertisement stage 823 then produces an ad selection result identifying the advertisement requirements by type and content. Additional details are provided in FIG. 9. The ad may then be selected in a search stage 824, wherein an internal database within distribution system 120 such as database 128, and/or external databases 865 and/or 875, such as databases 115, 116 or 510, containing publisher or third party information may be searched. An ad is then selected from one of the databases in stage 825, and the ad is then formatted based on the device type and other criteria and provided to one or more carriers through carrier interfaces such as are shown in FIG. 1a and FIG. 1b at stage 826. It is noted that one or more ads may be selected per page, and in typical embodiments there are no restrictions on the number of ads per page. It is also noted that the step described above may be changed and/or replaced with other steps depending on the request criteria provided.

Figure 9A:
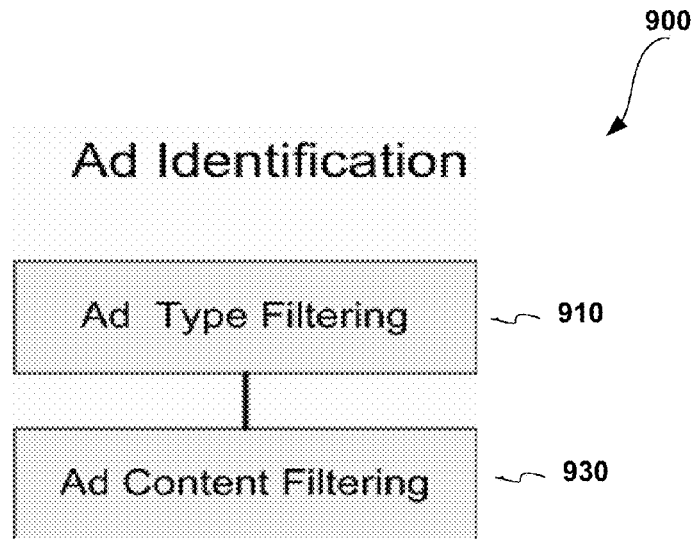
FIG. 9a illustrates a process for advertising identification in accordance with an embodiment of the present invention.
Figure 9B:
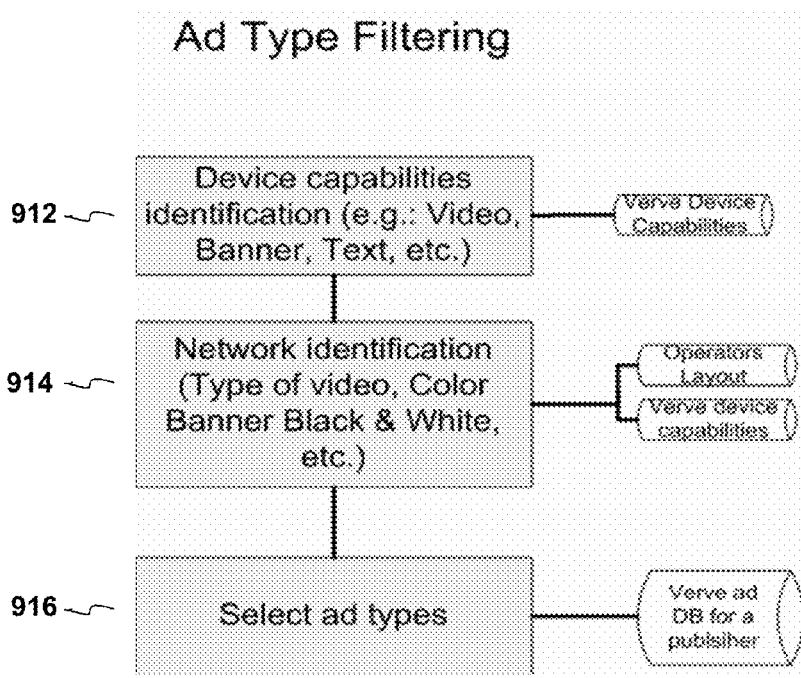
FIG. 9b illustrates a process for advertising/content type filtering in accordance with an embodiment of the present invention.
Figure 9C:
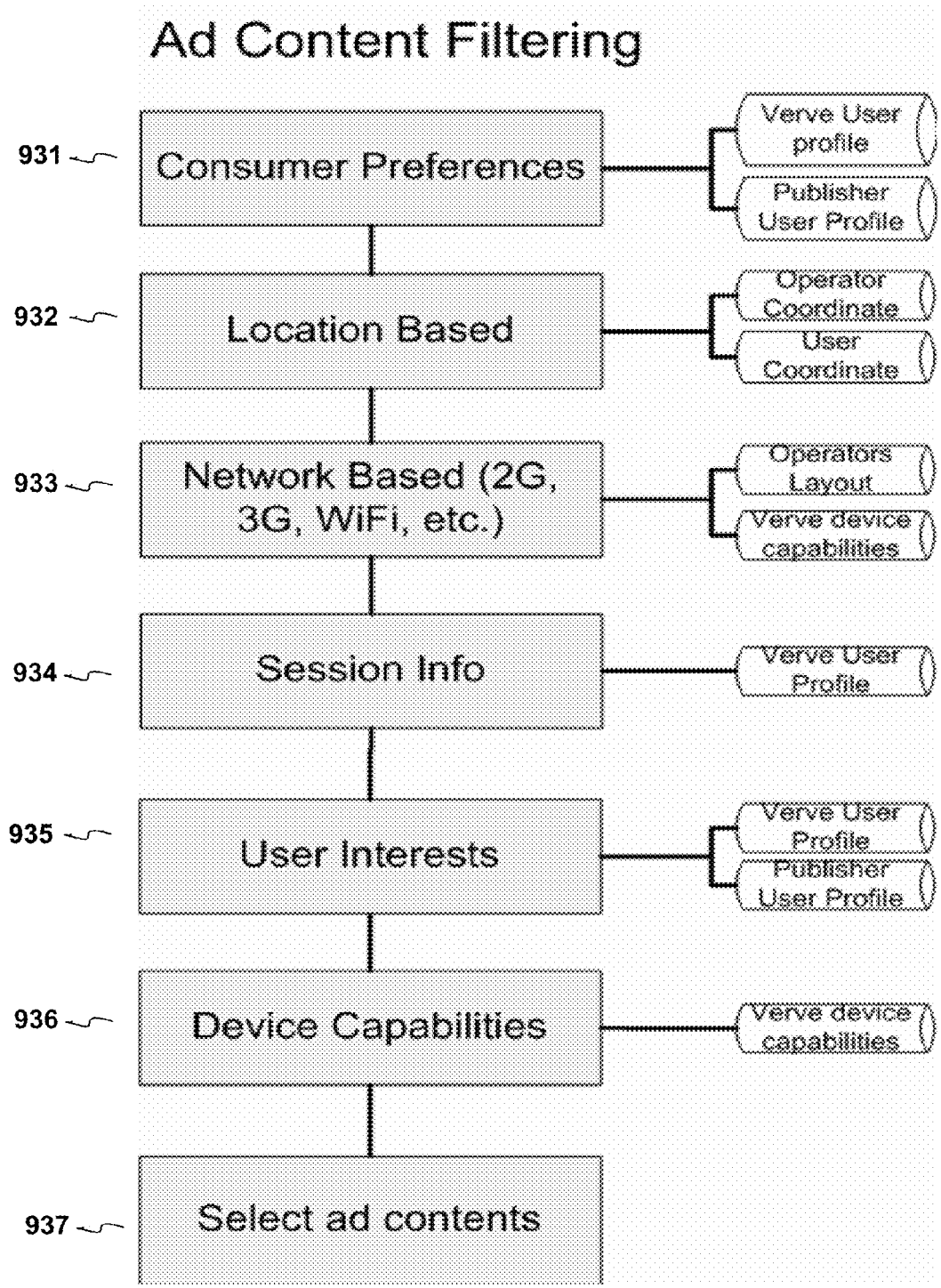
FIG. 9c illustrates a process for advertising/content filtering in accordance with an embodiment of the present invention.

FIG. 9 illustrates additional aspects of ad/content identification and filtering in accordance with an embodiment of the invention. It is apparent that the stages shown are for purpose of illustration only and not limitation. Accordingly, other stages or combinations are possible within the spirit and scope of the invention. As shown in FIG. 9a, ad identification may include stages of ad type filtering 910 and ad content filtering 930. FIG. 9b further illustrates an embodiment of an ad type filtering stage 910. Device capabilities associated with a particular user's mobile device and/or carrier requirements may first be identified at stage 912. Information of this type may be provided from a database of device and carrier information accessible within distribution system 120. In a typical embodiment, the request by a user, as well as other data, may first be examined. For example, in WAP browsing information may be available in the HTTP header, and the LBS header and the context of the request may also be examined. Once the device capability has been determined, as for example is illustrated in FIGS. 9b and 9c, network and associated information may then be determined in stage 914. This information may also be provided by one or more databases within distribution system 120. Finally, ad types may be selected in stage 916. Ad types will typically be selected from one or more databases associated with advertiser/publisher content. It will be noted that the databases may also include a third party advertising provider database and/or an operator database. It is noted that one or more ads may be selected per page, and there will typically not be any restriction on the number of ads per page.

FIG. 9c further illustrates an embodiment of an ad content filtering stage 930. It is apparent that the stage shown are for purpose of illustration only and not limitation. Accordingly, other stages or combinations are possible within the spirit and scope of the invention. As shown in FIG. 9c, content may be determined by identifying consumer/user preferences in stage 931. User preferences may include information such as history of purchases, age or sex of the users, personal preferences such as preferred types of music, food, or other interests, type of device being used, and the like. This information is typically collected by operators/carriers. In addition, the same or other information may be collected and stored in distribution system 120. For example, information associated with users' purchase of sports tickets may be provided to processing modules within distribution system 120, where it may then be used to categorize users based on this information and/or associate personal preference information with particular users and stored in a database in system 120. As one example, a user buying Red Sox or Patriots tickets may be characterized as a sports fan with particular interest in a team or region. Likewise, a user purchasing Boston symphony tickets through a classified listing application may be categorized as a music or fine arts fan. In addition, one or more third party databases may also be used to provide information to aid in categorizing users so as to provide relevant content.

User information obtained as described above and/or by other means may be processed and stored in one or more databases within distribution system 120, where it may then be available to other processes and modules. Additional information related to a user's geographic position or location may be determined in stage 932. This information may come from carrier and/or user device information or may be determined by other means known in the art. Information on the user's wireless network may then be determined in stage 933. This information may include type of network (i.e. 2G, 3G, WiFi, etc.) provided by the carrier and/or maintained in one or more databases within distribution system 120. Session information may then be determined in stage 934. As denoted herein a session is a time when a user is connected to a wireless network. During a session, information may be collected to determine what the user may be interested in at that particular time. This information may come from one or more databases within distribution system 120 based on a user profile. Additional information related to user interests may be determined in stage 935. This information may be provided by one or more databases within distribution system 120. Device information may be provided in stage 936. This information may come from one or more databases in distribution system 120. A final selection stage 937 may be performed wherein one or more items of information provided in previous steps are used to select an appropriate advertisement and associated format.

Figure 14A:
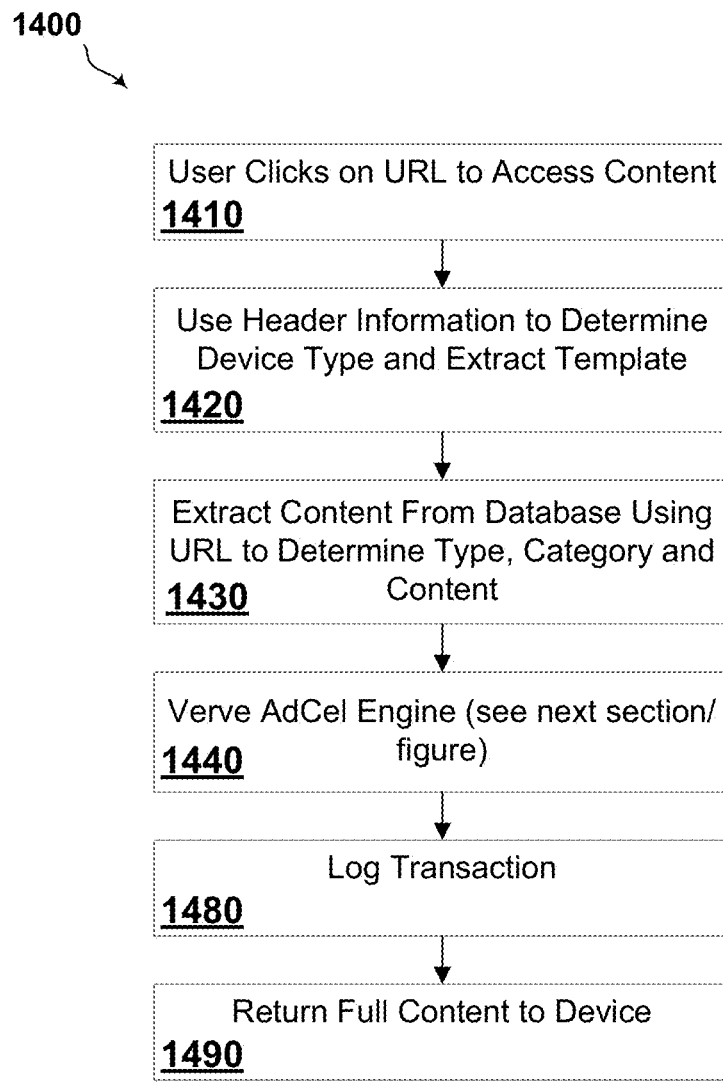
FIG. 14a illustrates an embodiment of high level system operation for generating content and ad selections in accordance with aspects of the present invention.

Attention is now directed to FIG. 14a which illustrates another embodiment of an advertisement selection process 1400 in accordance with aspects of the present invention. The process begins at stage 1410 when a user 140 requests content from system 120. This is typically done by the user by clicking on a URL on a mobile device to access the system. The URL may be provided on a browser on the device and/or may also be provided on a standalone application associated with system 120. In some cases the URL may be associated with a particular carrier such as is further described below. URL and other information is typically included in a message header accompanying the user request.

As used herein, a partner is a single newspaper, magazine, or other data source that provides content feeds specific to a particular geographic area. These feeds are typically presented under a single brand name, typically the name of the publication. A portal is the mobile user's entry point to partner data. A portal may offer data from multiple partners, or it may consist of only a single partner's data. Partners may be offered on multiple portals. For example, some portals are:

Verve Off-Deck (vw.vrvm.com)
Verizon (verizon.vm.com)
The URL http://verizon.vrvm.com/ is the portal landing page in this example.
Likewise, for generic off-deck access, the partner mnemonics should be the same. Generic Verve off-deck URLs look like:
http://vm.vrvm.com/mh/
http://vw.vrvm.com/austin/
Implementation for ad: Therefore it is possible to traffic advertisement on a per-partner and per-portal basis. This may mean both separate "ad-tags" for each portal a partner is a member of and inserting a portal+partner reference ID into an ad request.

The URL is then intercepted to determine which portal (based on the URL) is serving the content. The portal is important as it affects what network ad is used and the template which provides the look and feel of the page. At stage 1420 the header information is used to determine the type of device being used by user 140, and to extract an appropriate template based on the device. The content is then extracted from a database at stage 1430 to determine the type, category and specific content. An AdCell engine is then applied at stage 1440 to select an appropriate ad as is further described below. Each transaction in the system is typically logged at stage 1480, with the data sent to a data warehousing function, such as is shown in subsystem 220 in FIG. 2, wherein reporting for partners and advertisers may be continually updated. Associated reports or other data may then be used for auditing or other purposes. At the last step, the full content may then be sent back to the requesting device associated with user 140 through the carrier 130, with the content tailored to the user, based on the user's interest or other criteria, the carrier 130, connectivity capabilities, and/or the user's device capability.

Figure 14B:
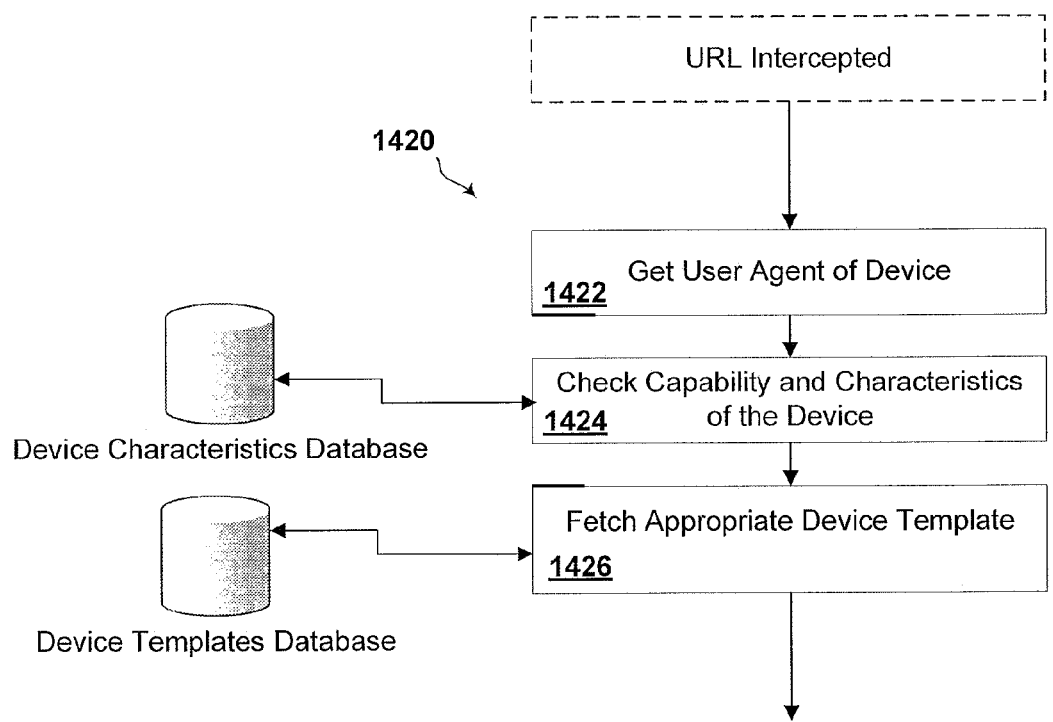
FIG. 14b illustrates an embodiment of device type determination in accordance with aspects of the present invention.

FIG. 14*b* illustrates additional details of an embodiment of stage 1420 as shown in FIG. 14*a*. As noted previously, each user's device may have different device capabilities. A database of these capabilities may be stored in system 120 and may be used to dynamically provide an associated template. The template may be further customized based on publishers requests or requirements or based on other criteria. In addition, if no device template is defined for a particular publisher and/or device, a default template may be provided. In a typical embodiment, a template is a series of files having a preset or predefined format, so that a particular application does not have to be recreated each time it is used. At stage 1422 the system 120 determines the device type based on the user agent header. At stage 1424 the device capabilities and characteristics are obtained, such as by using the WURFL open source database or another database providing the device type and capabilities. Once this information is determined, a device specific template or default template may be selected at stage 1426, typically from a publisher template database internal to system 120, however, the template may also be selected from an external database. In addition, the template may be configured to be specific to the publisher. For example, a particular publisher may have a set of templates that are unique to that publisher and to a set of devices.

Figure 14C:
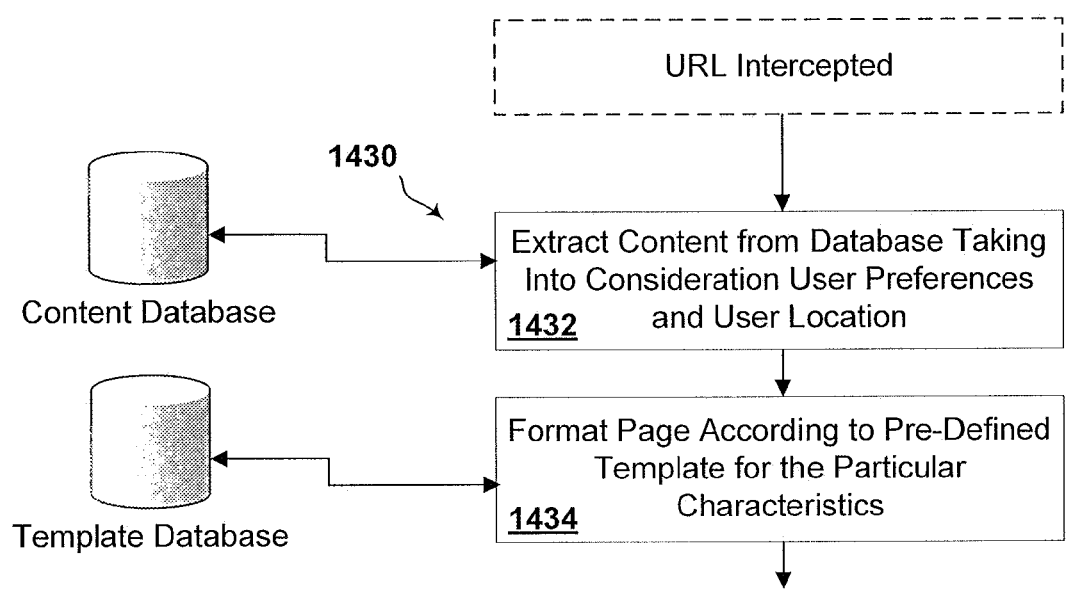
FIG. 14c illustrates an embodiment of page formatting in accordance with aspects of the present invention.

FIG. 14*c* illustrates additional details of an embodiment of stage 1430 as shown in FIG. 14*a*. As noted previously, one or more databases may store user characteristics such as user preferences, as well as other related information such as time of day and the user's location. At stage 1432, content may be extracted from a database, such as database 128 or another internal system database or external database, and then a user page may be formatted according to the pre-defined template at stage 1434. As noted previously, a template or template information may be retrieved from an internal or external database, such as database 128, and the page may be formatted according to a particular style defined by the template. The template may be based on capabilities associated with a particular device and/or based on a particular style or format associated with a publisher or other content provider.

Figure 14D:
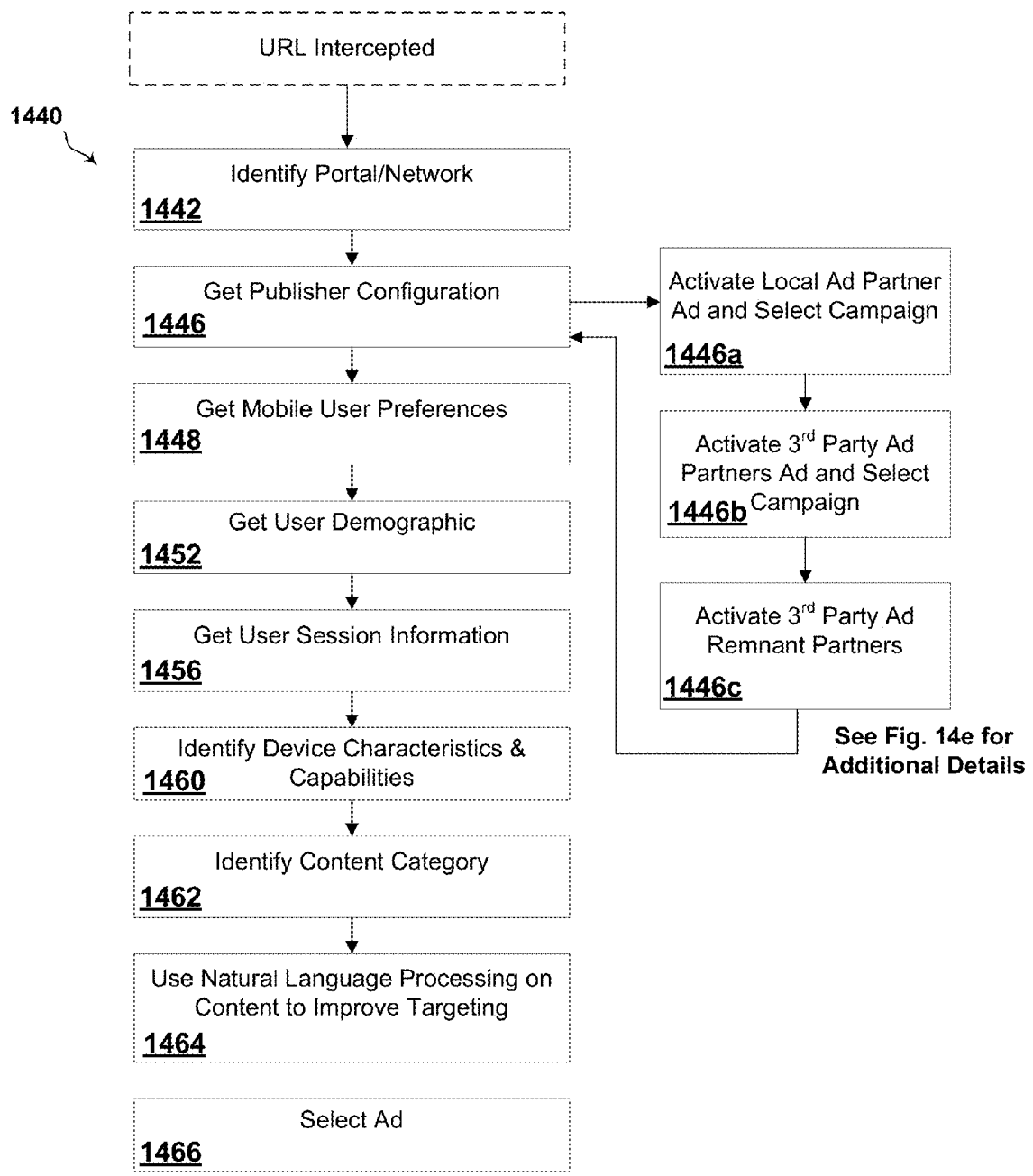
FIG. 14d illustrates an embodiment of ad selection in accordance with aspects of the present invention.

In addition to user requested content, one or more advertisements may be provided to the user in place of or in addition to the other content as shown in FIG. 14*a*. FIG. 14*d* illustrates additional details of an embodiment of a process stage 1440 (as shown in FIG. 14*a*) for facilitating ad selection. The process 1440 begins at stage 1442 with identification of the portal/network based on analysis of the intercepted URL. It is noted that particular carriers may have associated ad network partners, such as those shown in FIG. 14*e*. A query is generated for the ad network based on a set of information associated with the user, carrier, network, etc at the end of process 1440. For example, the query may include information about one or more of the network, the portal, the ad configuration, the campaign configuration, the flight configuration, the user preference, the location, the user preference, the location, the user demographic, the session information, device characteristics, and/or other information. Associated publisher configuration information may be determined at stage 1446. Once this information is obtained, an advertising provider selection process may be implemented as shown in FIG. 14*e*.

In addition, user preferences may be determined at stage 1448, user demographics may be determined at stage 1452, user session information may be determined at stage 1456, device characteristics and capabilities may be identified at stage 1456, natural language processing may be implemented at stage 1460 to improve targeting, and an ad may be selected at stage 1466 based on one or more of the above described criteria, or other criteria. In general publisher configuration and associated selection will be based on a series of ad selection stages wherein a local ad partner is first assessed at stage 1446*a* and a campaign is selected. When a request comes in, the ad management module 122 first attempts to serve it with local ads from a local ad partner B400 (as shown in FIG. 14*e*). If no relevant local ad partner ads are identified (i.e., no matches are found for a specific page, specific device, specific type of ad, etc.), 3rd party ad partners B500 are activated at stage 1446*b* and an appropriate campaign is selected. Likewise, if no 3rd party ad partner content is identified, 3rd party ad remnant partners B600 may be activated. The particular configuration for which ad network is to be used and under which category (local (b100), partners (b200), remnants (b300)) it belongs to is may be configurable through the mobile dashboard. In general, the 3rd party ad partners B500 will be national ad providers, whereas the local ad partners B400 will be local, with corresponding local content stored on a server in system 120. However, in some embodiments, national ad providers may be affiliated with local ad providers so that requests for national ads may be associated with one or more of the local ad partners based on user specific criteria, such as the user's interest, location, time of day, etc. 3rd party remnant ad providers are generally used only when no other local or third party ads are available.

To further describe a query request as shown in FIG. 14*d*, an example may be as follows. A user associated with a particular carrier, Sprint, may send a request for content, that will be processed to generate an associated ad in accordance with process 1440. Since the user is associated with Sprint, which has a mandatory ad network, Enpocket, the ad would be requested solely through Enpocket if the request comes through Sprint's portal. Alternately, if the request is made through another portal, the ad selection would not be limited to just the corresponding ad network, and local and/or third party ads may be selected. The header information provides details regarding the user's device, and one or more user criteria may also be included in the query, such as one or more user preferences, session information (such as whether the user is looking at sports, entertainment, news or other content category, time of day, the user's location, etc.). This might result in a query that requests an ad based on the user's Blackberry device (or other specific device), through the Enpocket ad network (if the request is made through Sprint), based on the user's preference for sports news, and possibly more specifically based on a particular sport, such as baseball, in a particular town where the user is present or is interested in. If successful, the query will return a corresponding ad matched to the particular targeted information along with any other provided content.

Figure 14E:
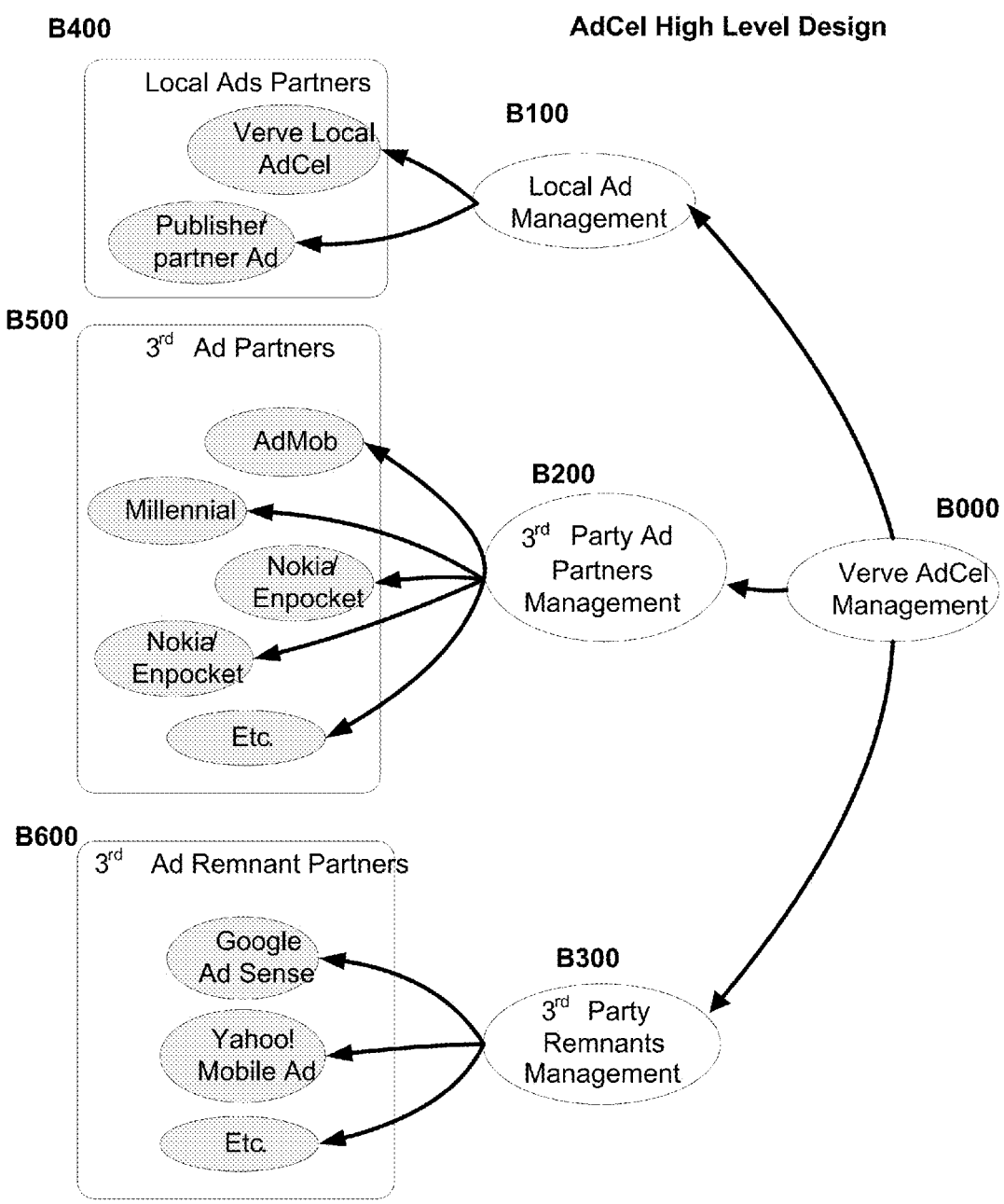
FIG. 14e illustrates an embodiment of ad partner selection in accordance with aspects of the present invention.

FIG. 14e depicts a typical configuration for ad selection criteria from various ad partners. The described functionality is denoted as AdCel and may be implemented in the Ad Management Network Module 122 as shown in FIG. 1a. As shown in FIG. 14e, local ad management may involve a local Publisher/partner local ad, which is typically the preferable initial ad target. However, carriers may require that third party ads are served through an ad partner associated with a particular carrier, particularly if the ad request is made through the carrier's deck (i.e., through a carrier URL). For example, as of the time of this application, Verizon mandates use of Third Screen Media for any ad going through their portal/network. Therefore, if access is made through the carrier, AdCel would attempt to retrieve an ad from Third Screen Media and if and AdCel cannot get a relevant impression from Third Screen Media, then the page would not have an ad. Other carriers, such as T-Mobile, do not have a corresponding ad provider, and therefore ads would be selected by AdCel first through a local ad partner B400, then through a 3rd party ad partner B500 if no local ads were available, and finally through a remnant partner B600. It is noted that the ad revenue will typically be greatest through the local partner, then the 3rd party ad partner, and then the remnant partner.

Figure 15:
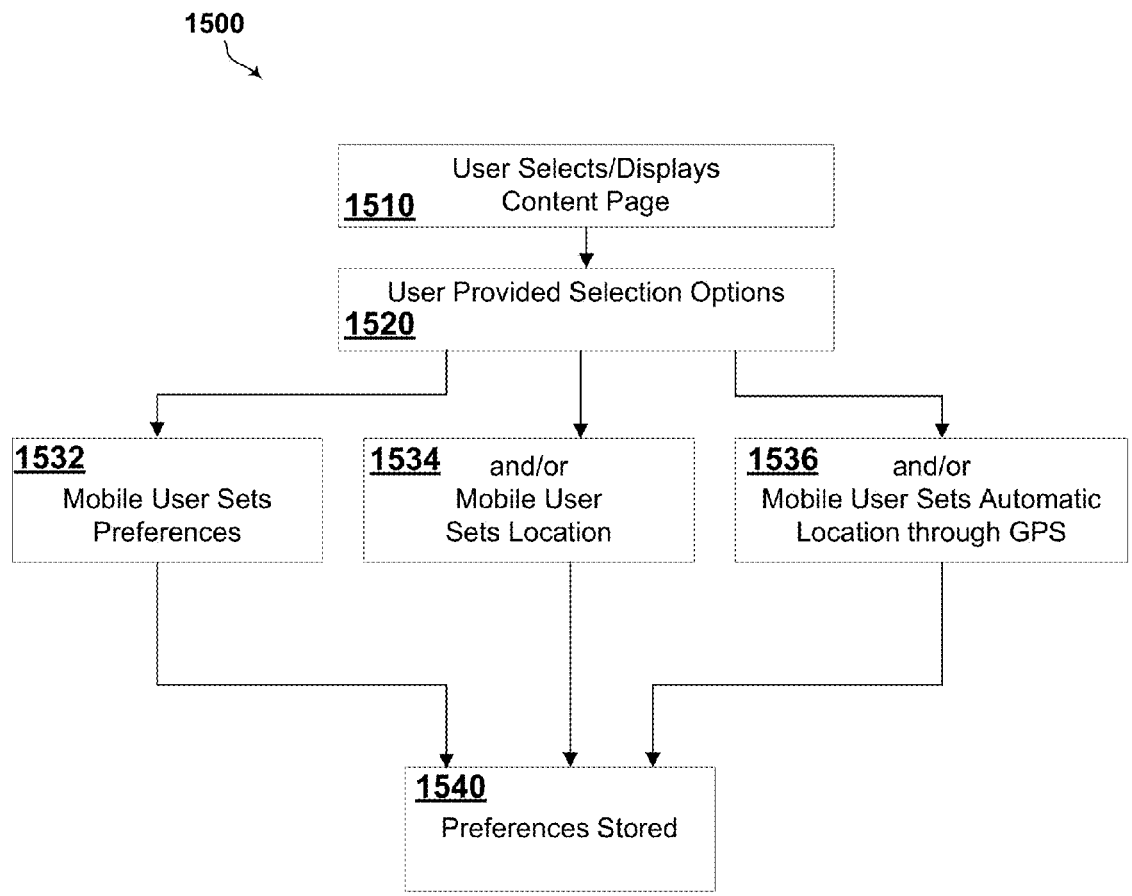
FIG. 15 illustrates an embodiment of user preference setting and customization in accordance with aspects of the present invention.

As noted previously, users 140 may be provided with an interface or other mechanism to customize their information so that user tailored content may be delivered. FIG. 15 illustrates one embodiment of a process 1500 for user customization. The process begins at stage 1510 with the user selecting a content page, such as via a URL associated with the Verve system or another provider system. The user is then provided with one or more selection options at stage 1520. These may include allowing the user to set preferences at stage 1532, and/or to set the user's location at stage 1534, and/or to set automatic location detection (when available with the user's device and associated carrier 130) at stage 1536. The preferences are then stored on a database in system 120 at stage 1540, such as database 128 or another database as shown in FIG. 2.

Carrier Related Modules and Interfaces

As shown in FIG. 1a and FIG. 1b, content may be provided to carriers from distribution system 120 through interface 122 and associated carrier interface 127. Carriers are typically concerned about who can provide appropriate content through their networks & users and what that content includes. This is typically managed by the carriers through their wireless access protocol (WAP). This may be done using XHTML Mobile Profile (MP), which is a strict subset of XHTML. Alternately, in some embodiments an implementation using FLASH Lite or other approaches such as a widget implementation may be used.

Figure 10:
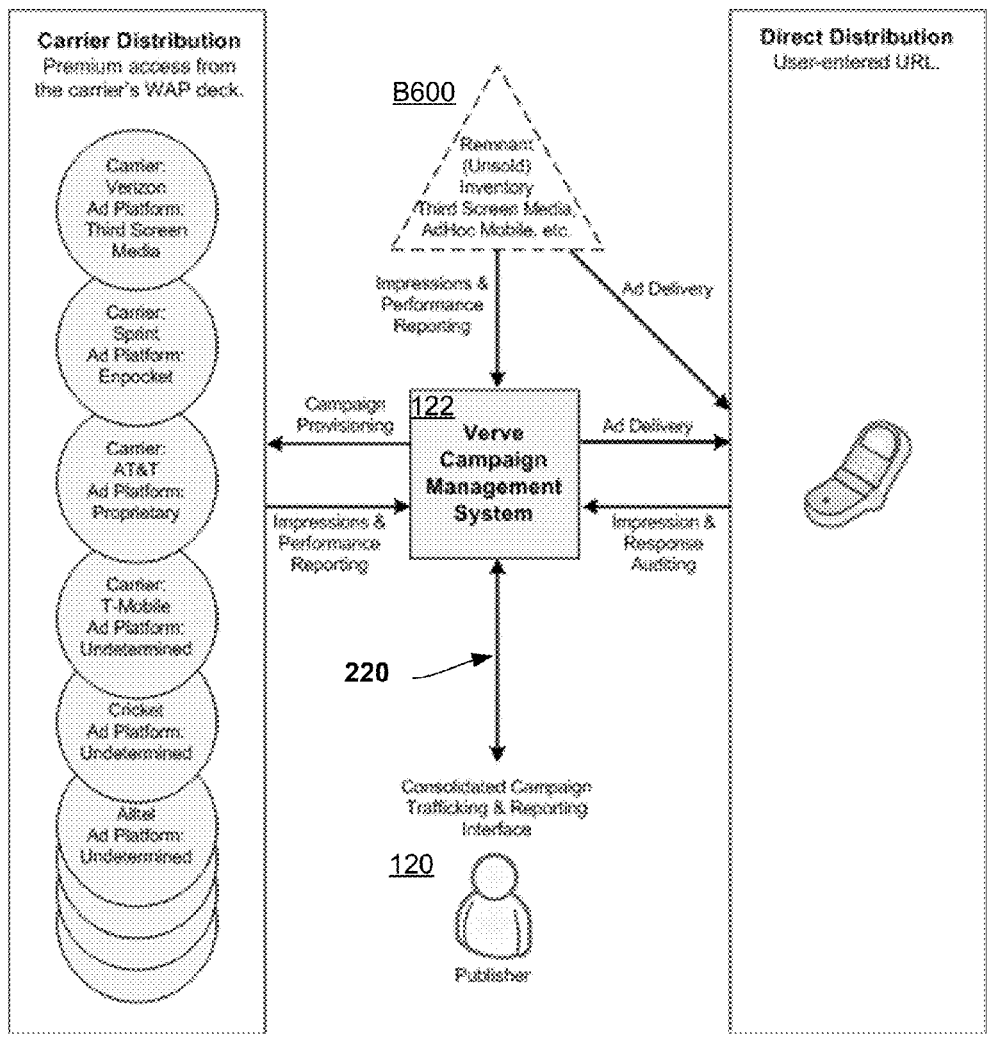
FIG. 10 illustrates an embodiment of a system for advertising/content distribution in accordance with the present invention.

In order to accommodate this, in some embodiments a system in accordance with the present invention may be configured as shown in FIG. 10. Distribution system 120 may provide direct distribution 1010 of content to users through a URL. However, Carriers/Operations 1020 typically dictate a specific partner to use for the ad partner (for example, Verizon requiring Third Screen Media). Therefore, the system should determine that a portal is associated with a particular 3rd party ad partner and request ads accordingly. In this case, ads will be requested from only the associated third party ad partner (B500) and not from local ad partners (B400) or the remnant partners (B600). Module 122 may receive impressions from either B600 or 1020 and logs the information for reporting to subsystem 220. Configuration may be done through the administrative interface within the publisher subsection of system 120.

In order to provide and receive information from particular users and carriers it is important to be able to identify wireless device capabilities associated with particular mobile devices. In some embodiments a distribution system 120 may be configured to interface with a wireless uniform resource file (WURFL) database of wireless device capabilities to determine capabilities of particular user devices, and store this information in a database where it may be used to manage ad identification and filtering such as is illustrated in FIGS. 9a and 9b and FIG. 14. WURFL is only one open source database; it will be apparent that in some embodiments other proprietary or open source databases may be used. In addition, other approaches as are known in the art may also be used.

Figure 11:
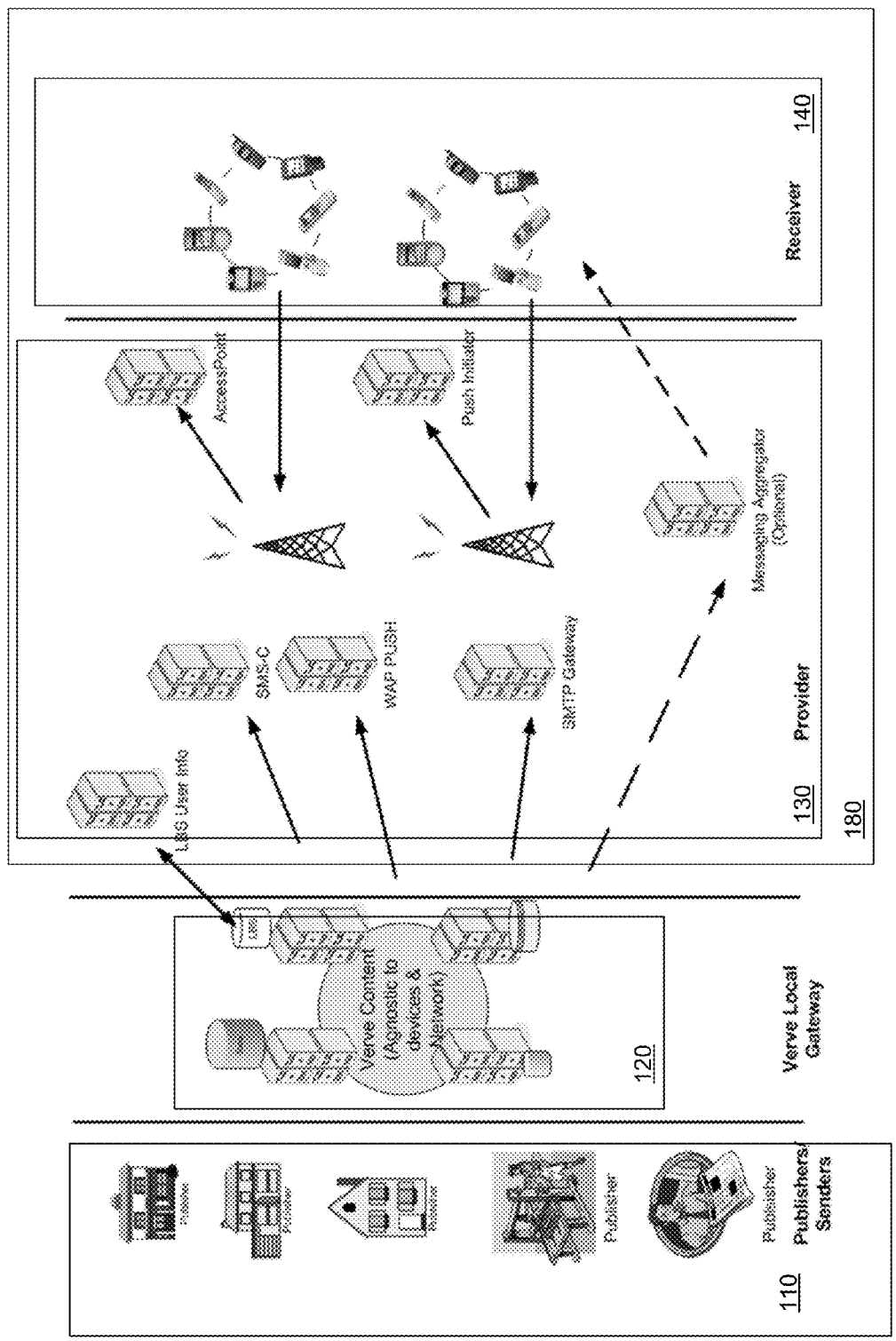
FIG. 11 illustrates an example of various content and distribution mechanisms to various users in accordance with aspects of the present invention.

Attention is now directed to FIG. 11 which illustrates embodiments of distribution of content from a distribution system 120 according to various means of distribution as are known in the art. FIG. 11 illustrates the level of complexity that may be managed by the systems as described herein to simplify interactions between content providers 102 (advertisers and publishers) at one end of the chain and users 140 at the other end. As shown in FIG. 11, content from content providers 102 may be received, managed, and distributed by distribution system 120 and provided to users 140 in formats designed to support multiple distribution means as appropriate for particular users and their associated devices including SMS, WAP PUSH, etc.

Figure 12:
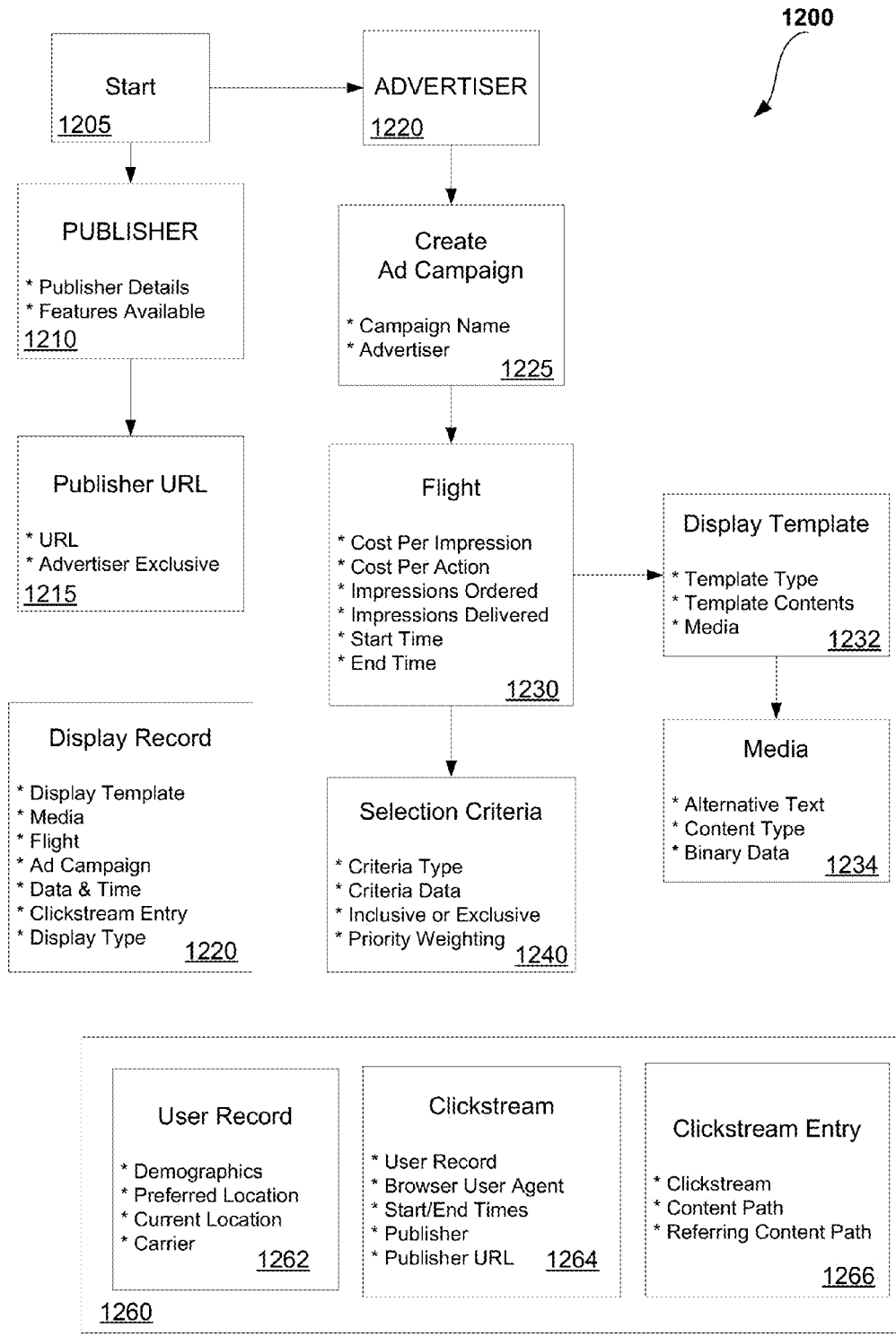
FIG. 12 illustrates an embodiment of a processing workflow in accordance with aspects of the present invention.

FIG. 12 illustrates a sample schema for an embodiment of a system and process in accordance with aspects of the present invention. As shown in FIG. 12, a content distribution process may first start at stage 1205 with an advertiser selecting a publishers site on which to run their campaigns. The campaign may include publisher criteria 1210 such as publisher details and features available as well as ad types requested. A specific URL may be assigned to the ad and additional criteria/parameters tagged at the end of the URL to help in targeting the consumer.

Advertisers 1220 (or publishers acting in proxy of their advertisers) may create advertising campaigns at stage 1225 that may consist of one or more "flights" or "insertion orders." A flight or insertion order is the administrative component of the ad, defining the cost of the ad, number of impressions, and when it should run. Flights may have multiple ad "creatives." A creative is where an individual ad is defined and targeting specified. Response information (e.g., landing page URL, etc.) may also be encapsulated in the creative. Each creative may consist of one or more files. Files are the actual banner, text, or other media type for the ad.

As an example, a San Diego Padres ad campaign may look like this:
  Ad Campaign: Padres 2007 Season
    Flight: Opening Day, 2007-04-01 to 2007-04-07; 10,000 impressions@$5 CPM
      Creative: Previous Season Record; response: landing page file
        File: record_big.jpg: large banner
        File: record_medium.jpg: medium banner
        File: record_small.jpg: small banner
        File: http://wap.padres.com/landing/record.html: landing page
      Creative: New Players; response: landing page file
        File: players_big.jpg: large banner
        File: players_medium.jpg: medium banner
        File: players_small.jpg: small banner File: http://wap.padres.com/landing/2007players.html: landing page
Flight: Military Night, 2007-04-05 to 2007-04-10; 5,000 impressions@$5 CPM
Creative: Camo Uniforms; response: landing page file
File: camo_big.jpg: large banner
File: camo_medium.jpg: medium banner
File: camo_small.jpg: small banner
File: http://wap.padres.com/landing/camo.html: landing page
Creative: Camo T-Shirts: response: SMS response file
File: tshirt_big.jpg: large banner
File: tshirt_medium.jpg: medium banner
File: tshirt_small.jpg: small banner
File: "Show this text message at the gate for your free Padres T-Shirt (code: XYZ123)": SMS response Having chosen a flight or flights, the advertiser may then choose related criteria on when and how advertisements are chosen for display, upload any necessary graphics or artwork, and transfer the information into the content distribution system 120. Ad campaigns may include campaign parameters such as a campaign name, associated advertiser, as well as other parameters. A flight model may be created at stage 1230, wherein the flight models a set of impressions that have been bought for an advertising campaign. Flights may also be used to keep track of advertisement "burn rate," in order to ensure that the advertisement is used evenly over the course of the flights' duration.

A flight relies on one or more display templates or styles of presentation to present an ad to a user. For example, an ad may be in the form of a banner, full page, SMS message, etc., and the format may be vertical screen device, horizontal screen device, or other display formats. Media templates may be used to provide specific format information needed, such as the template type and template content and media. The media file in the display template is a pointer to the actual file (binary file) in the media. The media may be stored as binary information in the database and transcoded to a specific instance depending on the device features and/or limitations.

Partners and Partner Tables

A partner entity may be representative of or associated with a publication partner using the system. A data structure denoted as a partner table or tables may be used to describe the partner entity in a data structure within one or more databases. Other entities, such as messaging ads and/or other modules as illustrated in FIGS. 1-4, may reference the partner entity to control access and control of various components.

FIG. 13 illustrates a screen shot of an implementation of a social app (A mobile sticky) in accordance with aspects of the present invention. This application may be used to enable any mobile user to create his/her own mobile site. A mobile user may use this application to create his/her own personal content that can be retrieved from a publisher's own mobile site or created with the user's own personal data. This functionality may be implemented by a process including enabling every mobile page on a mobile content management system (for our publishers) to become an RSS feed. For example, by enabling RSS creation of RSS feed, personal sites as described previously can subscribe to those feeds, thereby enabling subscription of sites, links, or areas of interest. So, if a particular user is interested in the Sports section from Boston Magazine, restaurants from the San Diego Reader, and events from NewsObserver these can be combined onto a single page or screen. The page can be created by adding the RSS feeds of these specific pages to a user customized page, denoted as a user's myPage. In addition, others can be invited to look at a user's myPage to view or comment on it. This type of social network application also enables inviting users to specific events and tracking the responses and location of their friends or other contacts.

For example, a user interacting with the display interface shown in FIG. 13 (the display provided on the user's mobile device, with the mobile device connected to system 120) can select the feed they want and the stories or other content he or she is interested in. In this case, the user is provided with an invite to a movie selection at 1305 (and is able to track who accepted the invitations and who declined). Item 1309 shows a Philadelphia (i.e. region specific) news link to the latest local news—the page can become the user's unique page which can then be shared with friends, acquaintances, etc. Customization of this page to a specific client can be done through a 3rd party provider using the APIs as illustrated in FIG. 1c and FIG. 1d.

Figure 13B:
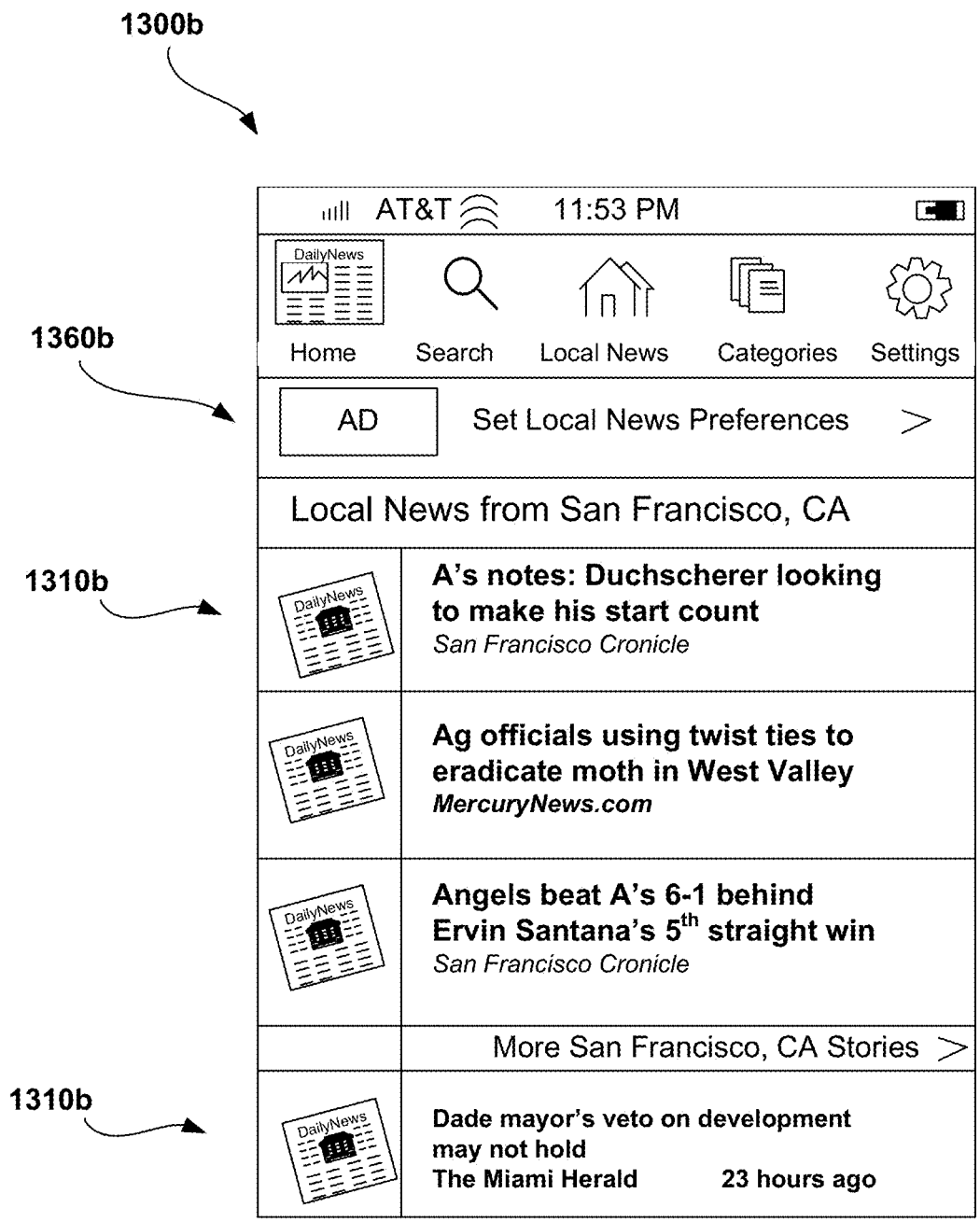
FIG. 13b illustrates an embodiment of a user display in accordance with aspects of the present invention.

FIG. 13b illustrates another screen shot 1300b of different user customized content delivery as facilitated on a different device capable of graphical content display. Item 1310b illustrates links with a photo to local news from a user's selected local news region (San Francisco in this case), along with local news 1320b from another user selected local region (Miami). As noted previously, the user may be enabled to select this information based on one or more categories or preferences as described previously. In this example, an advertisement 1360b may be inserted at the top of the content page, with the advertisement selected based on the user criteria as described previously, such as is shown in FIGS. 9 and 14. The links in 1310b may be associated with more than one local publisher, i.e., the San Francisco Chronicle and the MercuryNews. Since each is trying to get associated ad placement, ad generated revenues may be allocated between two or more publishers based on various criteria. In one exemplary embodiment, payment may be based on how high in the news article stack the particular publisher's article appears. This may depend on user preferences, time of story, device settings, relevance to the user, or other criteria. Payment for ad placement may also be divided among two or more publishers and/or associated providers. For example, in display 1300b, payment may be divided between the Chronicle, MercuryNews, and AT&T (or other providers).

Figure 13C:
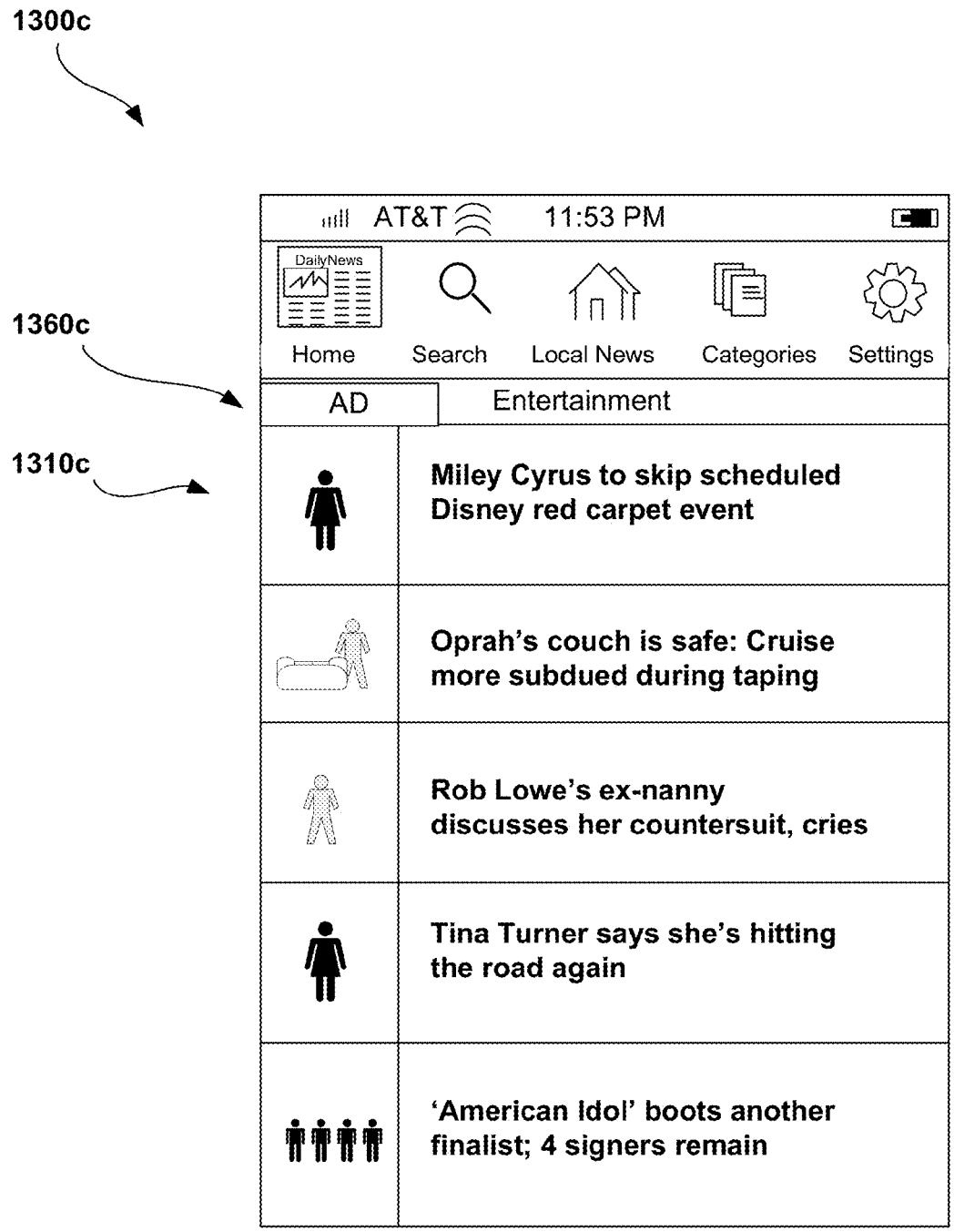
FIG. 13c illustrates an embodiment of a user display in accordance with aspects of the present invention.

FIG. 13c illustrates another screen shot 1300c of user customized content delivery, wherein the user selected content category is entertainment, and two entertainment related stories 1310c and 1320c (as well as others) are provided to the user based on his or her selection of entertainment as a category of interest. An ad 1360c may be placed on the page as described in FIGS. 9 and 14. In some cases, particular content may be provided by a specific content provider, such as the associated press (AP). In this case, ad placement revenue associated with ad 1360c would go solely to the AP. This example illustrates provision of AP content from the AP state wire, with the content selected and provided directly to the user, rather than through an AP associated publisher.

Figure 13D:
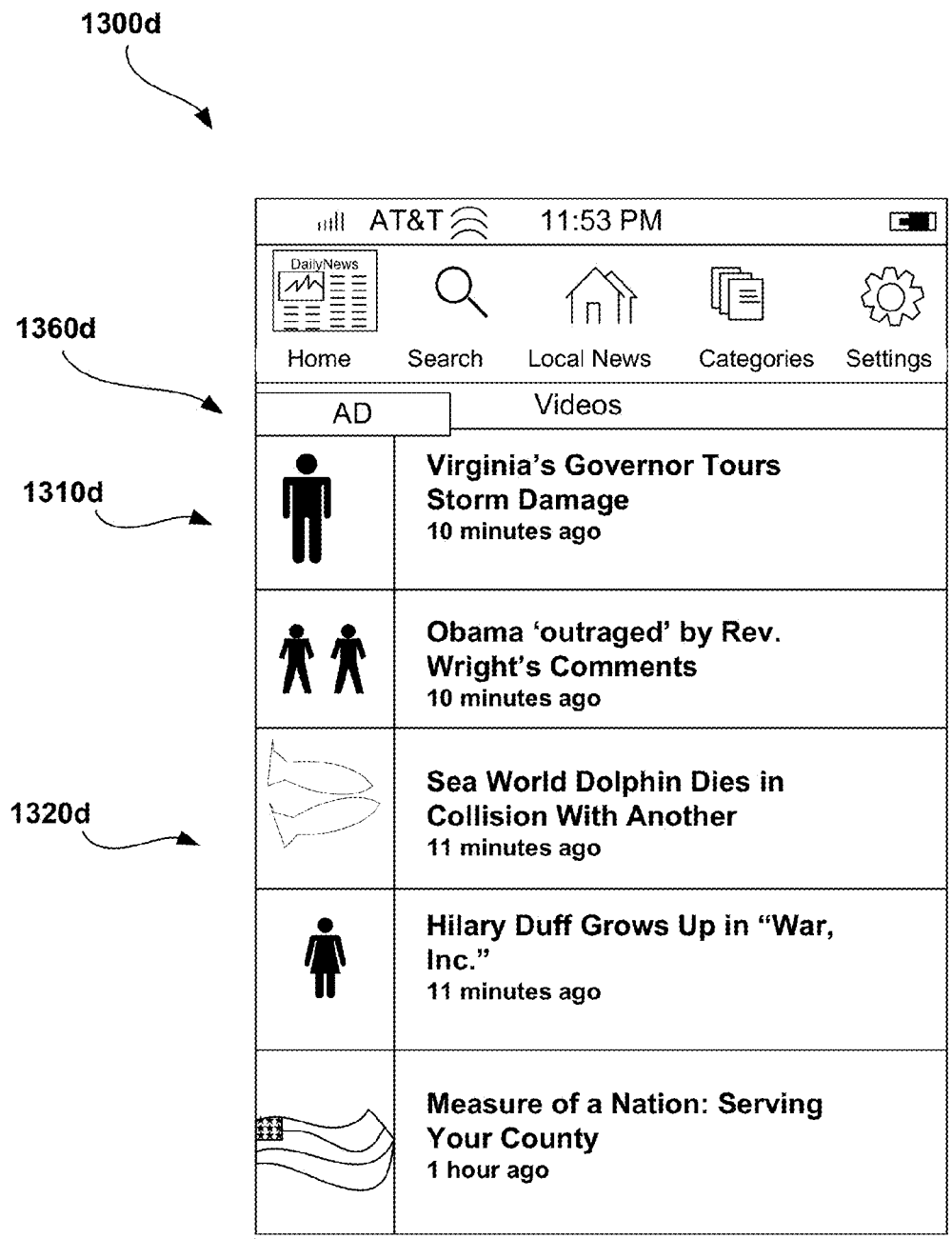
FIG. 13d illustrates an embodiment of a user display in accordance with aspects of the present invention.

FIG. 13d illustrates another screen shot 1300d of user customized content delivery, wherein the user selected content category is videos, and two video links 1310d and 1320d (as well as others) are provided to the user. An ad 1360d may be placed on the page as described in FIGS. 9 and 14.

It is noted that these display screens show just one embodiment of the present invention based on particular user selection criteria, as well as device and network capabilities. In a typical implementation, the system will automatically determine the capabilities of the particular user's device and tailor the page to both the user's interest and the device and network capabilities.

It is noted that in various embodiments the present invention may relate to processes such as are described or illustrated herein and/or in the related applications. These processes are typically implemented in one or more modules comprising systems as described herein and/or in the related applications, and such modules may include computer software stored on a computer readable medium including instructions configured to be executed by one or more processors. It is further noted that, while the processes described and illustrated herein and/or in the related applications may include particular stages, it is apparent that other processes including fewer, more, or different stages than those described and shown are also within the spirit and scope of the present invention. Accordingly, the processes shown herein and in the related applications are provided for purposes of illustration, not limitation.

As noted, some embodiments of the present invention may include computer software and/or computer hardware/software combinations configured to implement one or more processes or functions associated with the present invention such as those described above and/or in the related applications. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language, Java, C, C#, C++, or other programming languages and software development tools as are known in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
receiving a first plurality of advertising content, a second plurality of advertising content and a third plurality of advertising content, the first plurality of advertising content being associated with a first plurality of local advertising content providers, the second plurality of advertising content being associated with a second plurality of national advertising content providers, the third plurality of advertising content being associated with a plurality of remnant advertising content providers, each local advertising content provider from the first plurality of local advertising content providers having a respective geographic scope different than a geographic scope of each national advertising content provider from the second plurality of national advertising content providers;
receiving, via a first device, from a user device a request to provide a set of content from a plurality of sets of content to the user device;
selecting a first advertising content from the first plurality of advertising content based on a location of the user device when the location of the user device is within the geographic target scope of the first advertising content;
selecting a second advertising content from the second plurality of advertising based on the location of the user device when no first advertisement content from the plurality of advertising content is selected and when the location of the user device is within the geographic scope of the second advertising content;
selecting a third advertisement content from the third plurality of advertisement content when no first advertisement content from the first plurality of advertising content and no second advertising content from the second plurality of advertising content are selected; and
sending, via the first device, content associated with the set of content and the selected first advertising content, the second advertising content or the third advertising content to the user device.

2. The method of claim 1, wherein the location of the user device includes an indication of a longitude and a latitude of the user device.

3. The method of claim 1, wherein the location of the user device includes information representative of a neighborhood, a city and a state of the user device.

4. The method of claim 1, wherein:
the selecting the first advertising content includes selecting the first advertising content based on prior use information of the user device associated with the location; and
the selecting the second advertising content includes selecting the second advertising content based on the prior use information of the user device associated with the location.

5. The method of claim 1, wherein:
the selecting the first advertising content includes selecting the first advertising content based on a prior use information of the user device associated with a feature of the user device; and
the selecting the second advertising content includes selecting the second advertising content based on the prior use information of the user device associated with the feature of the user device.

6. The method of claim 1, wherein:
the selecting the first advertising content includes selecting the first advertising content based on (1) a time of day associated with the request and (2) a prior use information of the user device associated with a feature of the user device; and
the selecting the second advertising content includes selecting the second advertising content based on (1) the time of day associated with the request and (2) the prior use information of the user device associated with the feature of the user device.

7. A method, comprising:
receiving a first plurality of advertising content and a second plurality of advertising content, the first plurality of advertising content being associated with a first plurality of local advertising content providers, the second plurality of advertising content being associated with a second plurality of national advertising content providers, each local advertising content provider from the first plurality of local advertising content providers having a respective geographic scope different than a geographic scope of each national advertising content provider from the second plurality of national advertising content providers;
receiving, via a first device, from a user device a request to provide a set of content from a plurality of sets of content to the user device;
selecting a first advertising content from the first plurality of advertising content based on a location of the user device, prior use information and the geographic target scope of the first advertising content;
selecting a second advertising content from the second plurality of advertising, when no first advertisement content from the plurality of advertising content is selected, based on the location of the user device, the prior use information and the geographic scope of the second advertising content;
sending, via the first device and to the user device, content associated with the set of content and the first advertising content when selected or the second advertising content when selected;
receiving a third plurality of advertising content that is associated with a plurality of remnant advertising content providers;
selecting a third advertisement content from the third plurality of advertisement content when no first advertisement content from the first plurality of advertising content and no second advertising content from the second plurality of advertising content are selected; and
sending, via the first device and to the user device, content associated with the set of content and the third advertising content.

8. The method of claim 7, wherein the location of the user device includes an indication of a longitude and a latitude of the user device.

9. The method of claim 7, wherein the location of the user device includes information representative of a neighborhood, a city and a state of the user device.

10. The method of claim 7, wherein the prior use information is associated with a prior location of the user device.

11. The method of claim 7, wherein the prior use information is associated with a feature of the user device.

12. The method of claim 7, wherein:
the selecting the first advertising content includes selecting the first advertising content based on a time of day associated with the request; and
the selecting the second advertising content includes selecting the second advertising content based on the time of day associated with the request.

13. An apparatus, comprising:
a first interface module receives local advertising content from at least one local advertisement provider;
a second interface module receives third party advertising content from a plurality of national advertisement providers;
a third interface module receives listing advertising content from a plurality remnant advertising content providers, the first interface module, the second interface module and the third interface module are collectively provides an interface to a first device; and
a processing module operatively coupled to the first interface module, the second interface module and the third interface module, the processing module receives a request for content from a second device associated with a user via the first device,
the processing module selects, in response to the request, an advertisement from the at least one local advertisement provider based on a location of the user device, prior use information and the geographic target scope of the first advertising content,
the processing module selects an advertisement from the plurality of national advertisement providers, when no advertisement from the at least one local advertisement provider is selected, based on the location of the user device, the prior use information and the geographic scope of the advertisement from the plurality of national advertisement providers,
the processing module selects an advertisement from the plurality of remnant advertising content providers when no advertisement from the at least one local advertisement provider is selected and when no advertisement from the at least one national advertisement provider is selected,
the processing module formats, for delivery to said second device via the first device based at least in part on a set of device capabilities associated with the second device, the advertisement from the at least one local advertisement provider when selected or the advertisement from the plurality of national advertisement providers when selected.

14. The apparatus of claim 13, wherein the location of the user device includes an indication of a longitude and a latitude of the user device.

15. The apparatus of claim 13, wherein the location of the user device includes information representative of a neighborhood, a city and a state of the user device.

16. The apparatus of claim 13, wherein the prior use information is associated with a prior location of the user device.

17. The apparatus of claim 13, wherein the prior use information is associated with a feature of the user device.

18. The apparatus of claim 13, wherein:
the processing module selects the advertisement from the at least one local advertisement provider based on a time of day associated with the request,
the processing module selects the advertisement from the plurality of national advertisement providers based on a time of day associated with the request.

* * * * *